(12) United States Patent
Watson et al.

(10) Patent No.: US 11,039,975 B2
(45) Date of Patent: Jun. 22, 2021

(54) PNEUMATIC MASSAGE

(71) Applicant: Leggett & Platt Canada Co., Halifax (CA)

(72) Inventors: Guilherme Hartenberg Watson, LaSalle (CA); Wade O'Moore, Belle River (CA); Horia Blendea, LaSalle (CA); Renato Colja, Windsor (CA); Robert J. McMillen, Tecumseh (CA)

(73) Assignee: Leggett & Platt Canada Co., Halifax (CA)

( * ) Notice: Subject to any disclaimer, the term of this patent is extended or adjusted under 35 U.S.C. 154(b) by 152 days.

(21) Appl. No.: 16/359,709

(22) Filed: Mar. 20, 2019

(65) Prior Publication Data
US 2020/0069508 A1    Mar. 5, 2020

Related U.S. Application Data

(63) Continuation-in-part of application No. 16/116,433, filed on Aug. 29, 2018.

(51) Int. Cl.
*F15C 1/16* (2006.01)
*A61H 9/00* (2006.01)
*B60N 2/90* (2018.01)

(52) U.S. Cl.
CPC .......... *A61H 9/0071* (2013.01); *B60N 2/976* (2018.02); *A61H 9/0078* (2013.01);
(Continued)

(58) Field of Classification Search
CPC .............. A61H 9/0071; A61H 9/0078; A61H 2201/5056; A61H 2201/1207;
(Continued)

(56) References Cited

U.S. PATENT DOCUMENTS

| 3,232,305 A | 2/1966 | Groeber |
| 3,306,538 A | 2/1967 | McCracken, Jr. |

(Continued)

FOREIGN PATENT DOCUMENTS

| CN | 101467931 A | 7/2009 |
| DE | 2536901 A1 | 1/1977 |

(Continued)

OTHER PUBLICATIONS

International Search Report and Written Opinion for Application No. PCT/CA2018/000183 dated May 1, 2019 (11 pages).

(Continued)

*Primary Examiner* — Minh Q Le
(74) *Attorney, Agent, or Firm* — Michael Best & Friedrich LLP

(57) ABSTRACT

A pneumatic system includes a fluidic switching module having an air passage and a vent in fluid communication with the air passage. The pneumatic system also includes a sound attenuator coupled to the fluidic switching module, the sound attenuator having a first chamber in fluid communication with the vent, a first orifice in fluid communication with the vent via the first chamber, a second chamber in fluid communication with the first chamber via the first orifice, and a second orifice in fluid communication with the first orifice via the second chamber.

22 Claims, 19 Drawing Sheets

(52) U.S. Cl.
CPC .............. *A61H 2201/0149* (2013.01); *A61H 2201/0169* (2013.01); *A61H 2201/1207* (2013.01); *A61H 2201/1238* (2013.01); *A61H 2201/1409* (2013.01); *A61H 2201/5056* (2013.01); *B60N 2/914* (2018.02)

(58) Field of Classification Search
CPC .... A61H 2201/1238; A61H 2201/1409; A61H 2201/0149; A61H 2201/0169; B60N 2/976; B60N 2/914
USPC ................................ 137/833, 840, 841, 834
See application file for complete search history.

(56) References Cited

U.S. PATENT DOCUMENTS

| | | | |
|---|---|---|---|
| 3,390,674 A | 7/1968 | Jones | |
| 3,444,897 A | 5/1969 | McCleod, Jr. | |
| 3,536,084 A | 10/1970 | Dorsey et al. | |
| 3,566,862 A | 3/1971 | Schuh | |
| 3,680,574 A | 8/1972 | Price | |
| 3,720,218 A | 3/1973 | Drzewiecki | |
| 3,734,116 A | 5/1973 | Trask, II | |
| 3,958,602 A | 5/1976 | Manion et al. | |
| 4,225,989 A | 10/1980 | Corbett et al. | |
| 4,258,753 A | 3/1981 | Limpaecher | |
| 4,373,553 A | 2/1983 | Drzewiecki | |
| 4,549,574 A | 10/1985 | Taylor | |
| 4,565,259 A | 1/1986 | Stoll | |
| 4,572,327 A * | 2/1986 | Dean ................ | E04B 1/84 181/224 |
| 4,747,467 A * | 5/1988 | Lyon ................ | F01D 25/30 181/218 |
| 4,756,230 A * | 7/1988 | Shew ................ | B25D 17/12 181/211 |
| 4,840,425 A * | 6/1989 | Noble ................ | A47C 7/467 297/284.1 |
| 5,266,754 A * | 11/1993 | Swift ................ | F16L 55/02 181/230 |
| 5,273,406 A | 12/1993 | Feygin | |
| 5,659,158 A * | 8/1997 | Browning ................ | F01N 1/08 181/265 |
| 6,572,570 B1 | 6/2003 | Burns et al. | |
| 6,722,467 B1 * | 4/2004 | Kusche ................ | F02M 35/1233 181/229 |
| 6,767,331 B2 | 7/2004 | Stouffer et al. | |
| 6,860,157 B1 | 3/2005 | Yang et al. | |
| 6,916,300 B2 | 7/2005 | Hester et al. | |
| 6,976,507 B1 | 12/2005 | Webb et al. | |
| 7,037,280 B1 | 5/2006 | Burns et al. | |
| 7,096,888 B1 | 8/2006 | Thurston et al. | |
| 7,128,082 B1 | 10/2006 | Cerretelli et al. | |
| 7,445,083 B2 * | 11/2008 | Wu ................ | F01N 1/003 181/251 |
| 8,043,238 B1 | 10/2011 | Tamura et al. | |
| 8,430,202 B1 * | 4/2013 | Mason ................ | F01D 17/105 181/210 |
| 8,550,208 B1 * | 10/2013 | Potokar ................ | F02C 6/08 181/212 |
| 8,770,229 B2 | 7/2014 | Gopalan et al. | |
| 9,119,705 B2 | 9/2015 | Parish et al. | |
| 9,573,679 B2 | 2/2017 | Golling et al. | |
| 9,618,150 B2 | 4/2017 | Bauer et al. | |
| 9,989,159 B2 | 6/2018 | Winkler et al. | |
| 10,724,549 B2 * | 7/2020 | Le ................ | F04D 29/40 |
| 2003/0070870 A1 * | 4/2003 | Reynolds ................ | F15B 21/008 181/230 |
| 2004/0097854 A1 | 5/2004 | Hester et al. | |
| 2005/0067218 A1 * | 3/2005 | Bristow ................ | F01D 17/105 181/237 |
| 2008/0121295 A1 | 5/2008 | Tippetts | |
| 2011/0108358 A1 * | 5/2011 | Edgington ................ | F02M 35/1266 181/229 |
| 2012/0055560 A1 | 3/2012 | Gopalan et al. | |
| 2012/0143108 A1 * | 6/2012 | Bocsanyi ................ | B60N 2/976 601/148 |
| 2013/0035619 A1 | 2/2013 | Freund | |
| 2013/0053102 A1 * | 2/2013 | Inagaki ................ | H04R 3/12 455/557 |
| 2014/0088468 A1 | 3/2014 | Murison | |
| 2016/0213553 A1 | 7/2016 | Oberg et al. | |
| 2018/0148187 A1 * | 5/2018 | Valleroy ................ | B64D 27/16 |

FOREIGN PATENT DOCUMENTS

| | | |
|---|---|---|
| DE | 3240710 A1 | 10/1984 |
| DE | 19509489 A1 | 9/1996 |
| EP | 1096913 A1 | 5/2001 |
| EP | 1326569 A1 | 7/2003 |
| EP | 1687543 A | 8/2006 |
| EP | 1851447 A1 | 11/2007 |
| EP | 1760262 B1 | 4/2008 |
| EP | 2012022 A2 | 1/2009 |
| EP | 2682612 A2 | 1/2014 |
| EP | 2627914 B1 | 9/2018 |
| JP | H0623306 A | 2/1994 |
| KR | 20130002774 U | 5/2013 |
| WO | 0067691 A1 | 11/2000 |
| WO | 0234195 A1 | 5/2002 |
| WO | 2005080800 A1 | 9/2005 |
| WO | 2006090130 A1 | 8/2006 |
| WO | 2010108254 A1 | 9/2010 |
| WO | 2012048853 A1 | 4/2012 |
| WO | 2015039701 A1 | 3/2015 |

OTHER PUBLICATIONS

International Search Report and Written Opinion for Application No. PCT/CA2020/000027 dated May 27, 2020 (12 pages).
International Search Report and Written Opinion for Application No. PCT/CA2019/000030 dated Apr. 17, 2019 (17 pages).

* cited by examiner

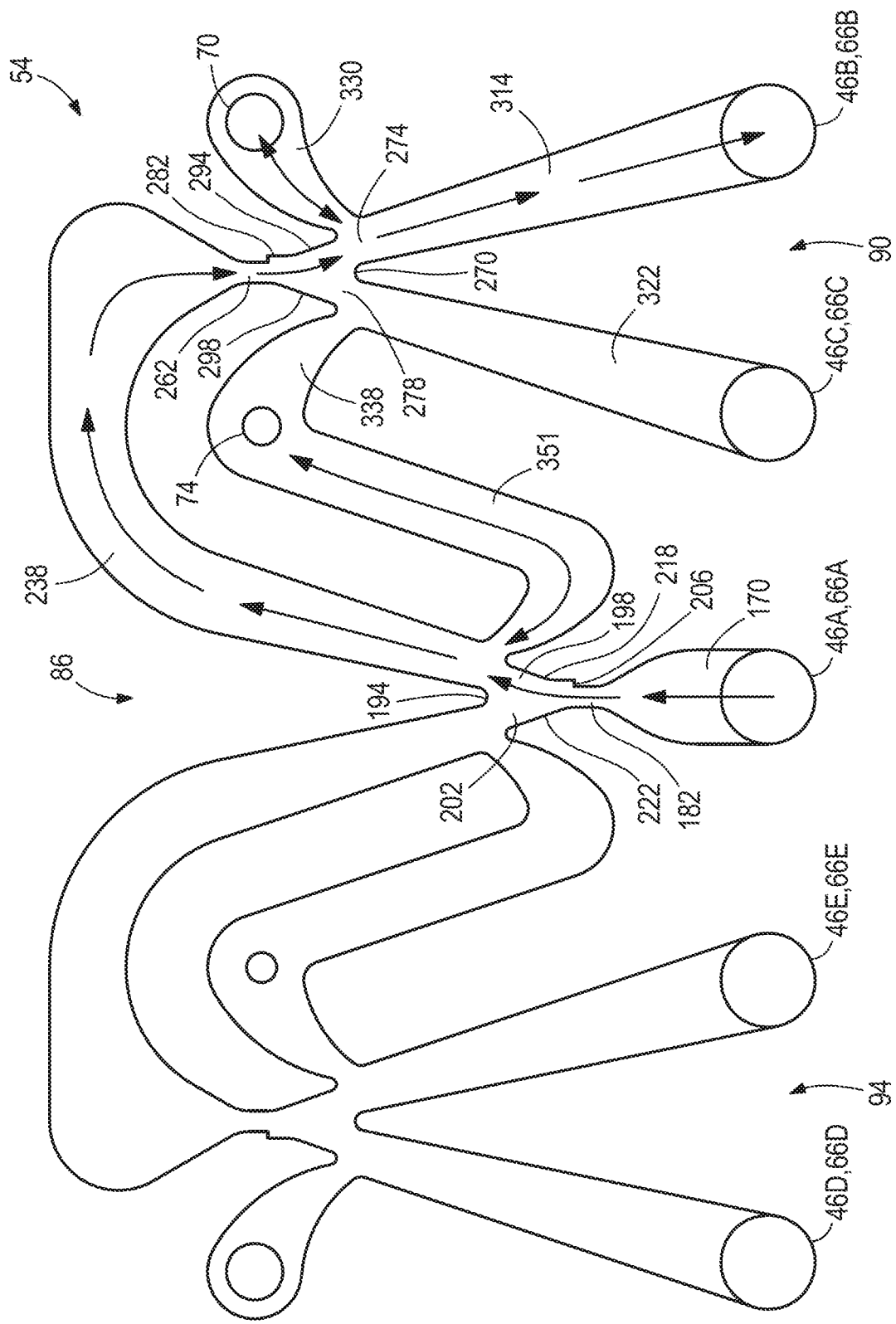

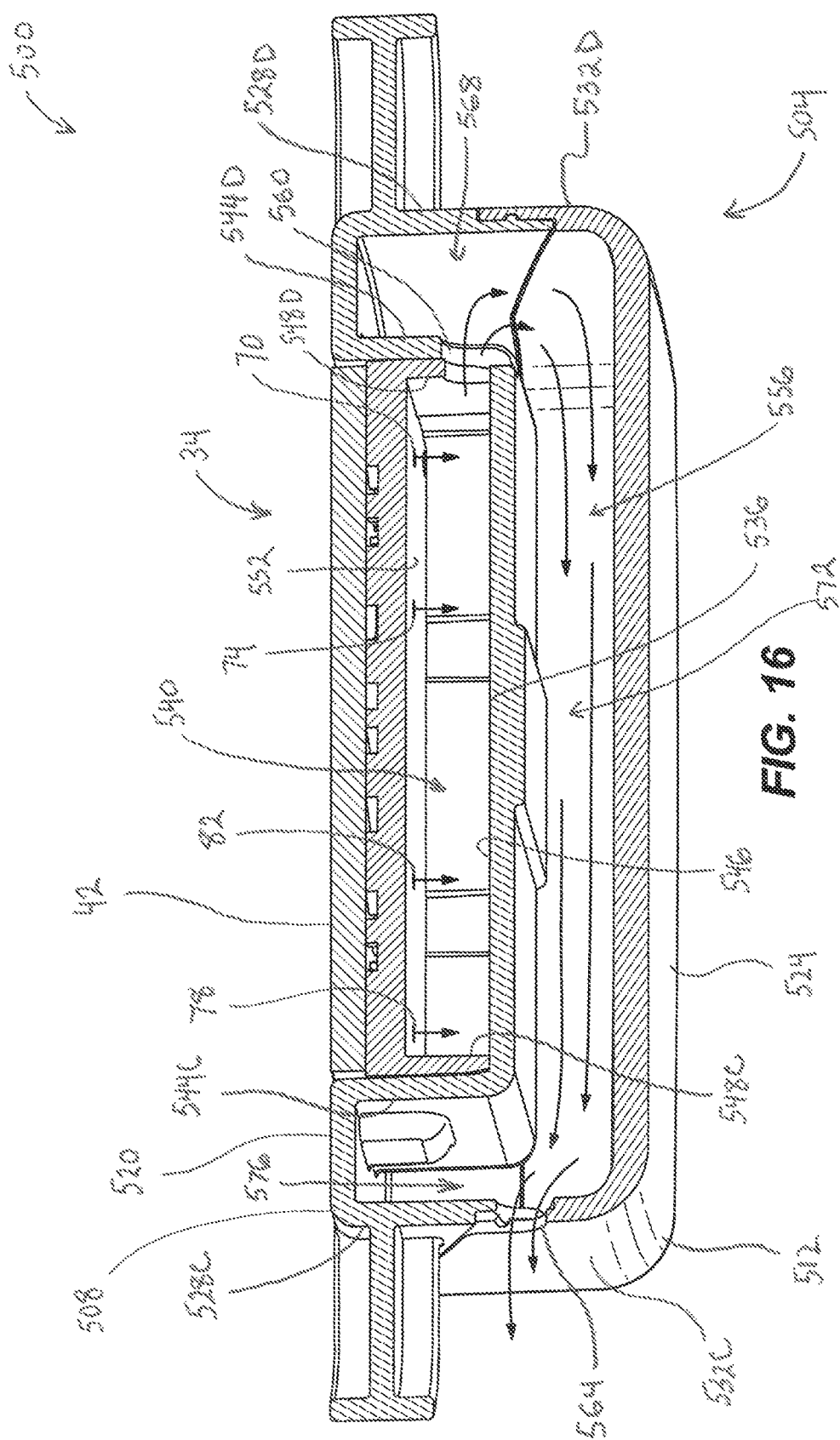

PNEUMATIC MASSAGE

CROSS-REFERENCE TO RELATED APPLICATIONS

This application is a continuation-in-part of co-pending U.S. patent application Ser. No. 16/116,433, filed on Aug. 29, 2018, the entire content of which is incorporated herein by reference.

BACKGROUND

The present disclosure relates to a pneumatic massage system for commercial and residential use, for example, office and home furniture, and more specifically for use within vehicular seating systems (aircraft, automobiles, etc.).

SUMMARY

The present disclosure provides, in one embodiment, a pneumatic system including a fluidic switching module having an air passage and a vent in fluid communication with the air passage. The pneumatic system also includes a sound attenuator coupled to the fluidic switching module, the sound attenuator having a first chamber in fluid communication with the vent, a first orifice in fluid communication with the vent via the first chamber, a second chamber in fluid communication with the first chamber via the first orifice, and a second orifice in fluid communication with the first orifice via the second chamber.

The present disclosure provides, in another embodiment, a noise attenuator for a fluidic switching module including a main body with a first wall, a first plurality of outer side walls, a plurality of inner side walls extending from the first wall, and a floor extending between the plurality of inner side walls. The noise attenuator also includes a lid coupled to the main body, the lid having a second wall opposite the first wall and a second plurality of outer side walls. A first orifice extends through one of the plurality of inner side walls, and the first orifice is in fluid communication with a chamber extending between the floor and the second wall. A second orifice extends through one outer side wall of the first plurality of outer side walls or one outer side wall of the second plurality of outer side walls.

The present disclosure provides, in another embodiment, a pneumatic system including a fluidic switching module with an air passage and a vent in fluid communication with the air passage, and a sound attenuator coupled to the fluidic switching module, the sound attenuator configured to attenuate noise generated by air flowing through the fluidic switching module to less than 40 dB across the entire audible range.

Other aspects of the disclosure will become apparent by consideration of the detailed description and accompanying drawings.

BRIEF DESCRIPTION OF THE DRAWINGS

FIGS. 10A-10E is a schematic representation of airflow operation through the fluidic switching module of FIG. 5.

FIG. 16 is the cross-sectional view of FIG. 15 further illustrating an airflow path from the fluidic switching module through the sound attenuator.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

DETAILED DESCRIPTION

Figure 1:
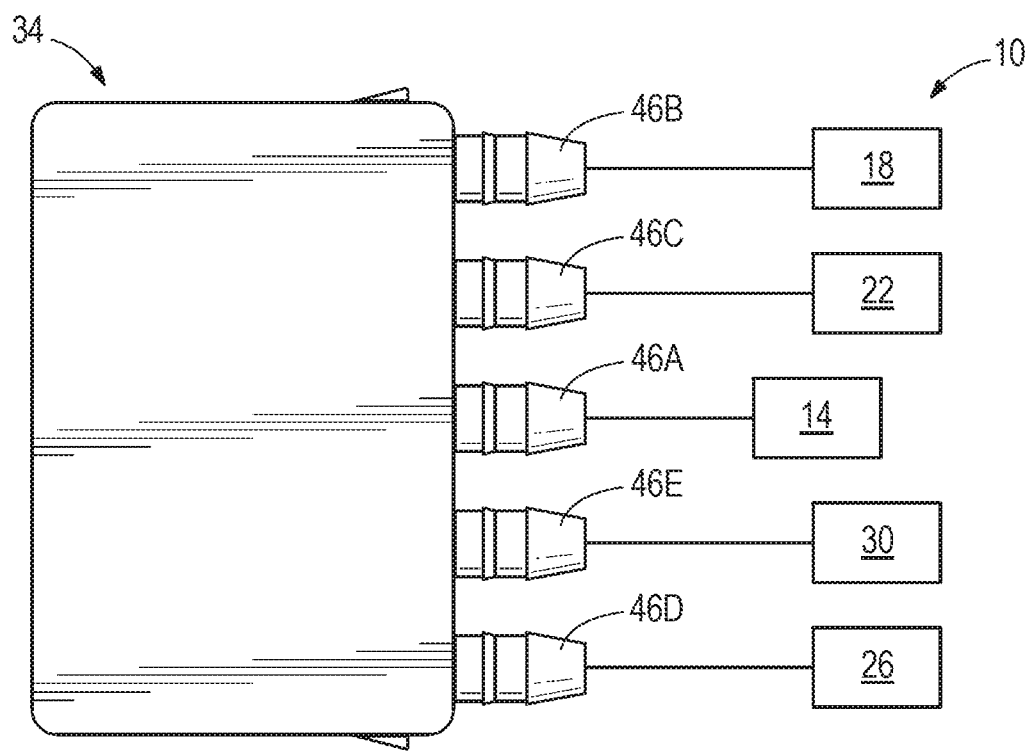
FIG. 1 is a schematic view of a pneumatic system including a fluidic switching module.

With reference to FIG. 1, a pneumatic system 10 (i.e., pneumatic massage system, oscillating pneumatic system, etc.) is illustrated. The pneumatic system 10 includes a pneumatic source 14 (e.g., an air pump, air compressor, etc.), a first bladder 18, a second bladder 22, a third bladder 26, and a fourth bladder 30. The pneumatic system 10 further includes a fluidic switching module 34 that is fluidly connected to the pneumatic source 14 and to the bladders 18, 22, 26, 30. In some embodiments, the pneumatic source 10 is driven by an electric motor. In other words, pneumatic pressure is generated by a dedicated electric motor. In alternative embodiments, the pneumatic source 10 is any suitable source of compressed air, including a pneumatic module or any pneumatic source within an existing vehicle pneumatic system.

As explained in greater detail below, the pneumatic system 10 is utilized to create a massage effect by cyclically inflating and deflating the bladders 18, 22, 26, 30 without the use of any electric or mechanical valves. Specifically, the pneumatic source 14 provides a source of pressurized air to the fluidic switching module 34, which controls the flow of air to the bladders 18, 22, 26, 30 in a predefined sequence without moving any portion of the fluidic switching module 34. In particular, the flow of air is controlled by the fluidic switching module 34 such that the bladders 18, 22, 26, 30 repeatedly inflate and deflate in a staggered fashion (i.e., out of unison inflation), thereby creating a massaging effect. In some embodiments, the pneumatic system 10 is integrated within a seat, which for the purposes of the following description may be any vehicle seat within a passenger compartment of a vehicle, though the seat is not necessarily limited to vehicular applications.

Figure 2:
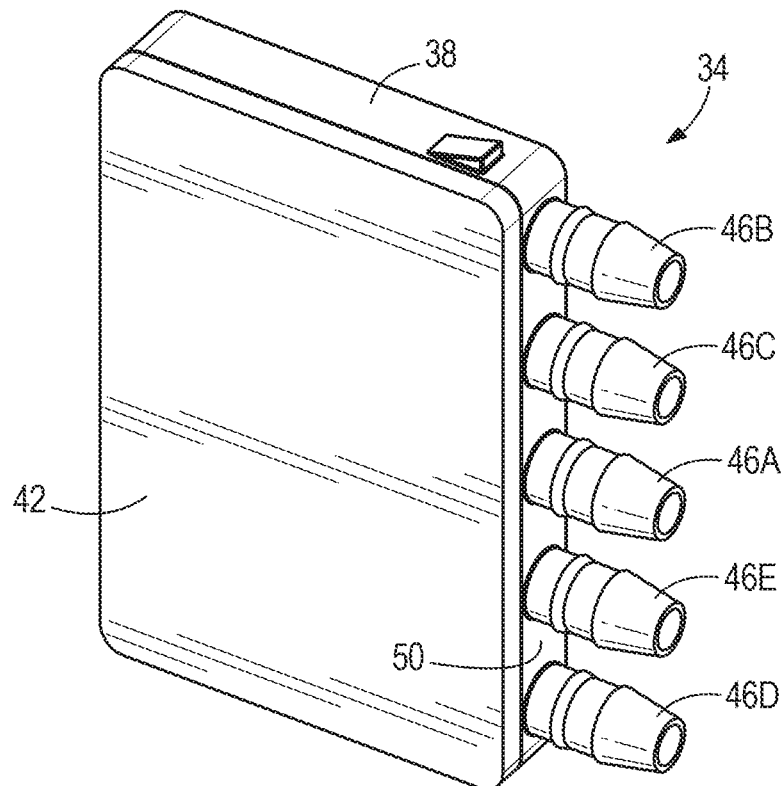
FIG. 2 is a front perspective view of the fluidic switching module of FIG. 1.

With reference to FIGS. 1-2, the fluidic switching module 34 includes a base 38 and a cover 42. The module 34 further includes five air connections 46A-46E formed on one side 50 of the base 38. In particular, the base 38 includes a pneumatic source connector 46A, a first bladder connector 46B, a second bladder connector 46C, a third bladder connector 46D, a fourth bladder connector 46E.

Figure 3:
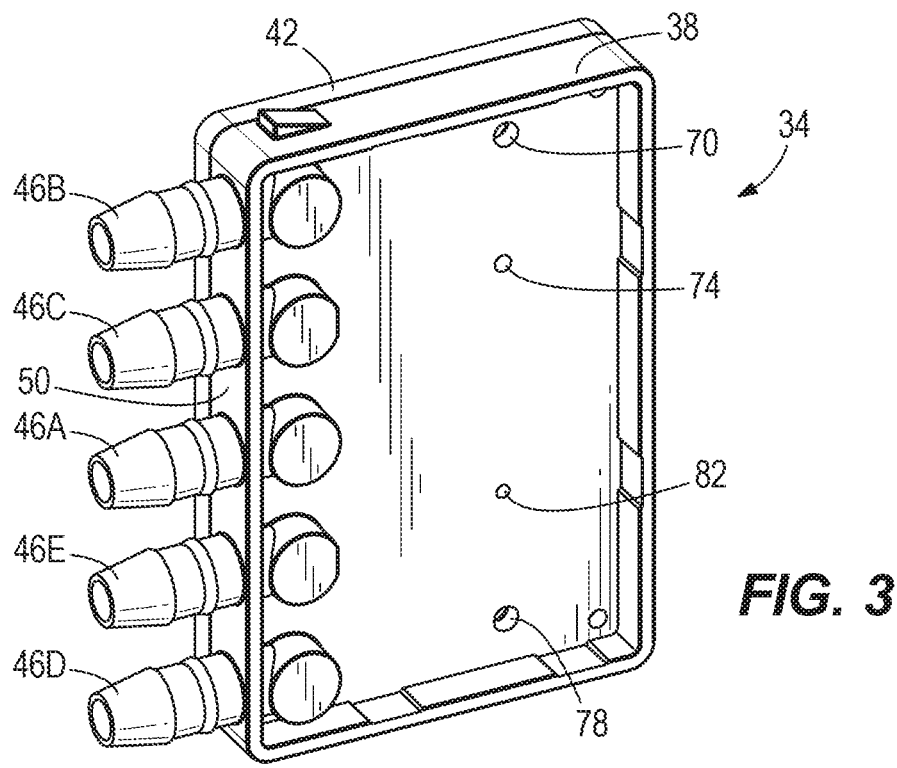
FIG. 3 is a rear perspective view of the fluidic switching module of FIG. 1.
Figure 4:
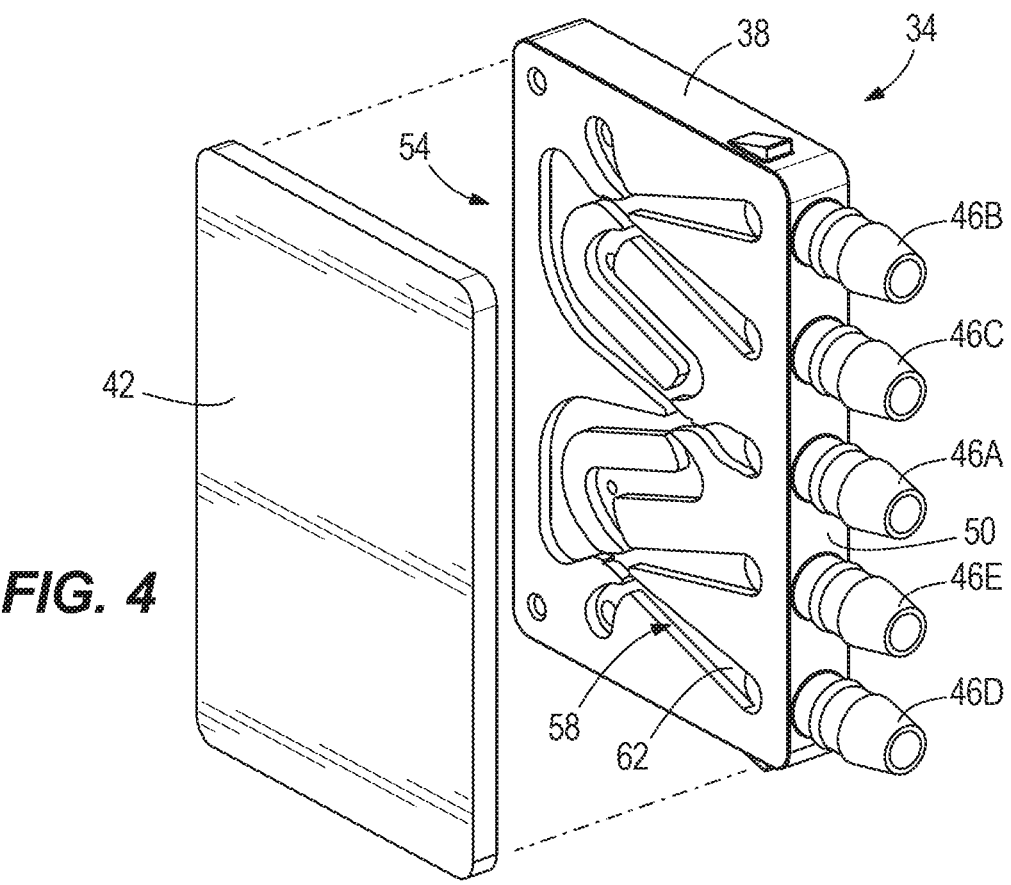
FIG. 4 is an exploded view of the fluidic switching module of FIG. 1.
Figure 5:
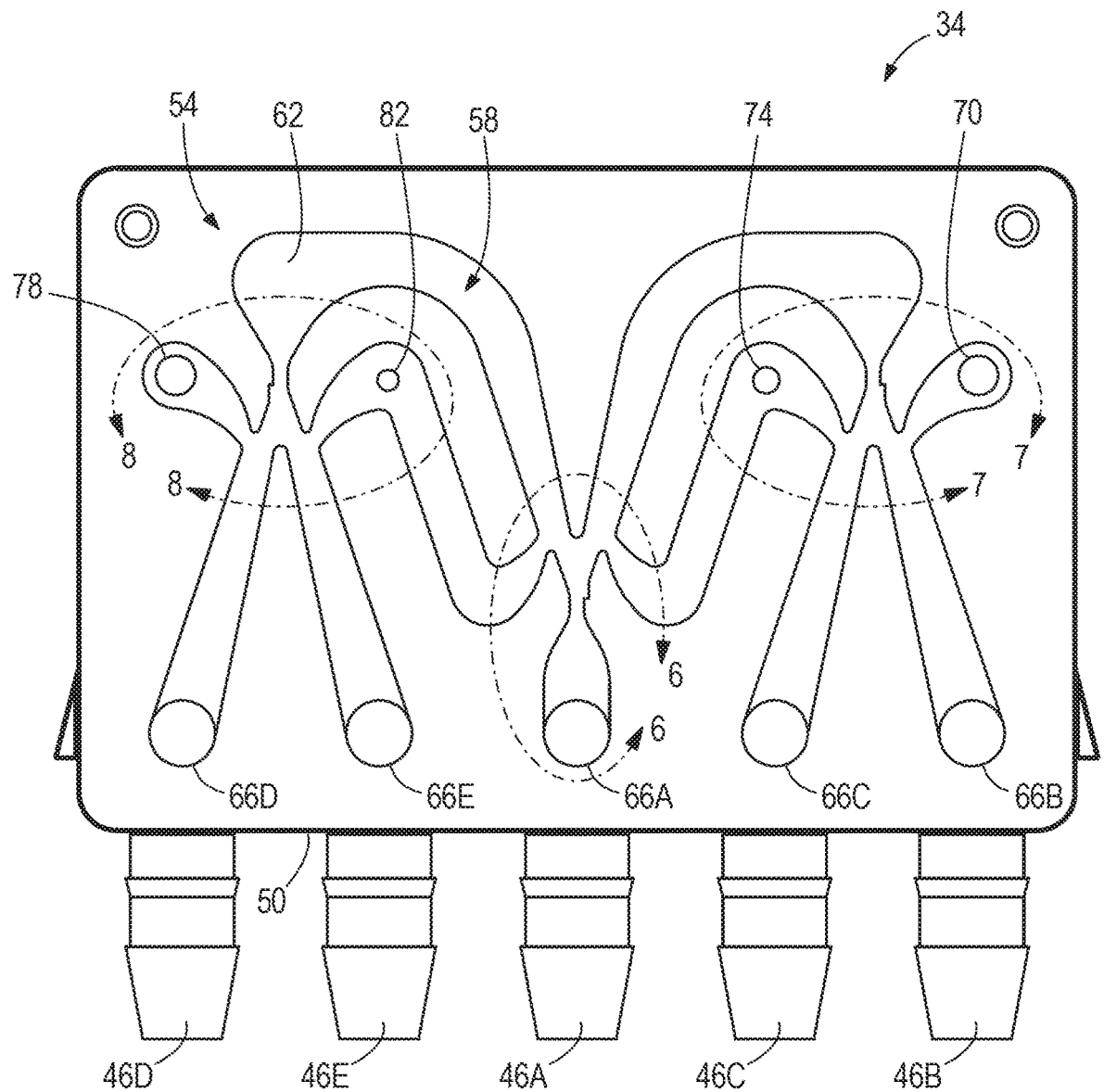
FIG. 5 is a front view of the fluidic switching module of FIG. 1, with a cover removed.

With reference to FIG. 4, an air passage 54 is formed in the base 38. In particular, the air passage 54 is partially defined by a channel 58 with a floor 62 and the cover 42. In other words, the air passage 54 is at least partially defined by the floor 62, the cover 42, and sidewalls extending between the floor 62 and the cover 42. With reference to FIG. 5, the air connections 46A-46E are fluidly connected to the air passage 54 via corresponding bores 66A-66E, which pass through the floor 62. In addition, vents 70, 74, 78, 82 (FIG. 3) to atmosphere are formed in the base 38 (more specifically, in the floor 62) to fluidly communicate the air passage 54 with atmosphere. The operation of the air passage 54 and the vents 70, 74, 78, 82 are described in greater detail below. In general, the air passage 54 and vents 70, 74, 78, 82 passively control (i.e., with no additional mechanical or electrical valves) the flow of air from the pneumatic source 14 to the bladders 18, 22, 26, 30 in a predetermined sequence.

Figure 9:
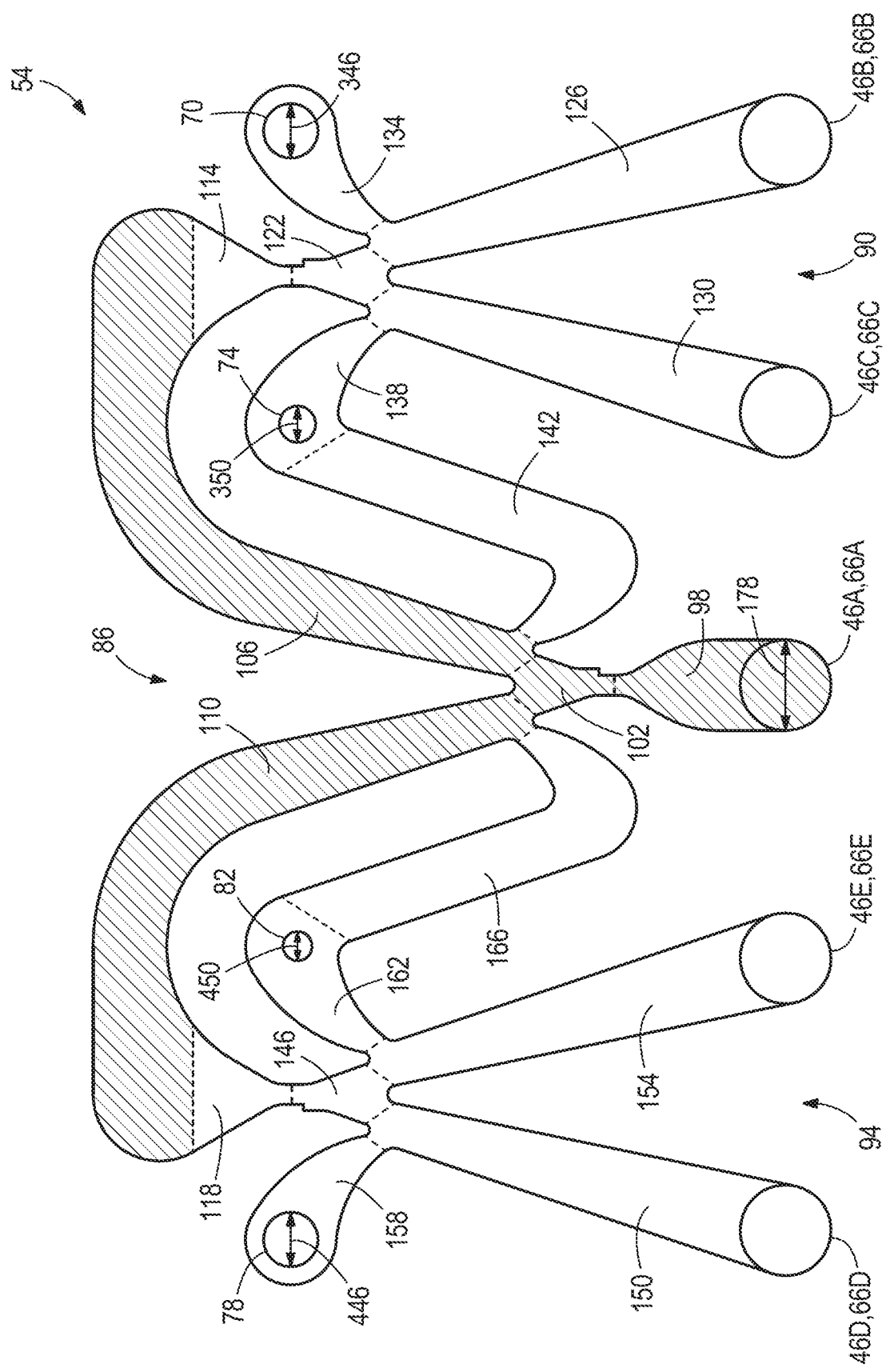
FIG. 9 is a schematic of an air passage of the fluidic switching module of FIG. 5.

With reference to FIG. 9, the air passage 54 defines a plurality of "zones" and "subsystems." In particular, the air passage 54 includes a first subsystem 86 (shaded in FIG. 9), a second subsystem 90 fluidly connected to the first subsystem 86, and a third subsystem 94 fluidly connected to the first subsystem 86. The first subsystem 86 includes an inlet zone 98 at a first upstream position including the air source connection 46A and a first splitter zone 102 positioned downstream from the inlet zone 98. The first subsystem 86 further includes a first transfer zone 106 and a second transfer zone 110. The first splitter zone 102 is fluidly connected to the first transfer zone 106 and the second transfer zone 110. The first transfer zone 106 is in fluid communication with an inlet zone 114 of the second subsystem 90. Likewise, the second transfer zone 110 is in fluid communication with an inlet zone 118 of the third subsystem 94.

With continued reference to FIG. 9, the second subsystem 90 includes the inlet zone 114 at a second upstream position and a second air splitter zone 122 fluidly connected to the inlet zone 114. The second subsystem 90 further includes a first bladder zone 126 and a second bladder zone 130 fluidly connected to the second splitter zone 122. The first bladder connection 46B is positioned within the first bladder zone 126 and the second bladder connection 46C is positioned within the second bladder zone 130. In addition, the second subsystem 90 includes a first vent zone 134 fluidly connected to the first bladder zone 126 and a second vent zone 138 fluidly connected to the second bladder zone 130. The first vent 70 is positioned within the first vent zone 134 and the second vent 74 is positioned within the second vent zone 138. Also, the second subsystem 90 includes a feedback zone 142 fluidly connected to the second vent zone 138 and the first transfer zone 106 of the first subsystem 86.

With continued reference to FIG. 9, the third subsystem 94 is similar to the second subsystem 90. The third subsystem 94 includes the inlet zone 114 at a third upstream position and a third air splitter zone 146 fluidly connected to the inlet zone 114. The third subsystem 94 further includes a third bladder zone 150 and a fourth bladder zone 154 fluidly connected to the third splitter zone 146. The third bladder connection 46D is positioned within the third bladder zone 150 and the fourth bladder connection 46E is positioned within the fourth bladder zone 154. In addition, the third subsystem 94 includes a third vent zone 158 fluidly connected to the third bladder zone 150 and a fourth vent zone 162 fluidly connected to the fourth bladder zone 154. The third vent 78 is positioned within the third vent zone 158 and the fourth vent 82 is positioned within the fourth vent zone 162. Also, the third subsystem 94 includes a feedback zone 166 fluidly connected to the fourth vent zone 162 and the second transfer zone 110 of the first subsystem 86.

Figure 6:
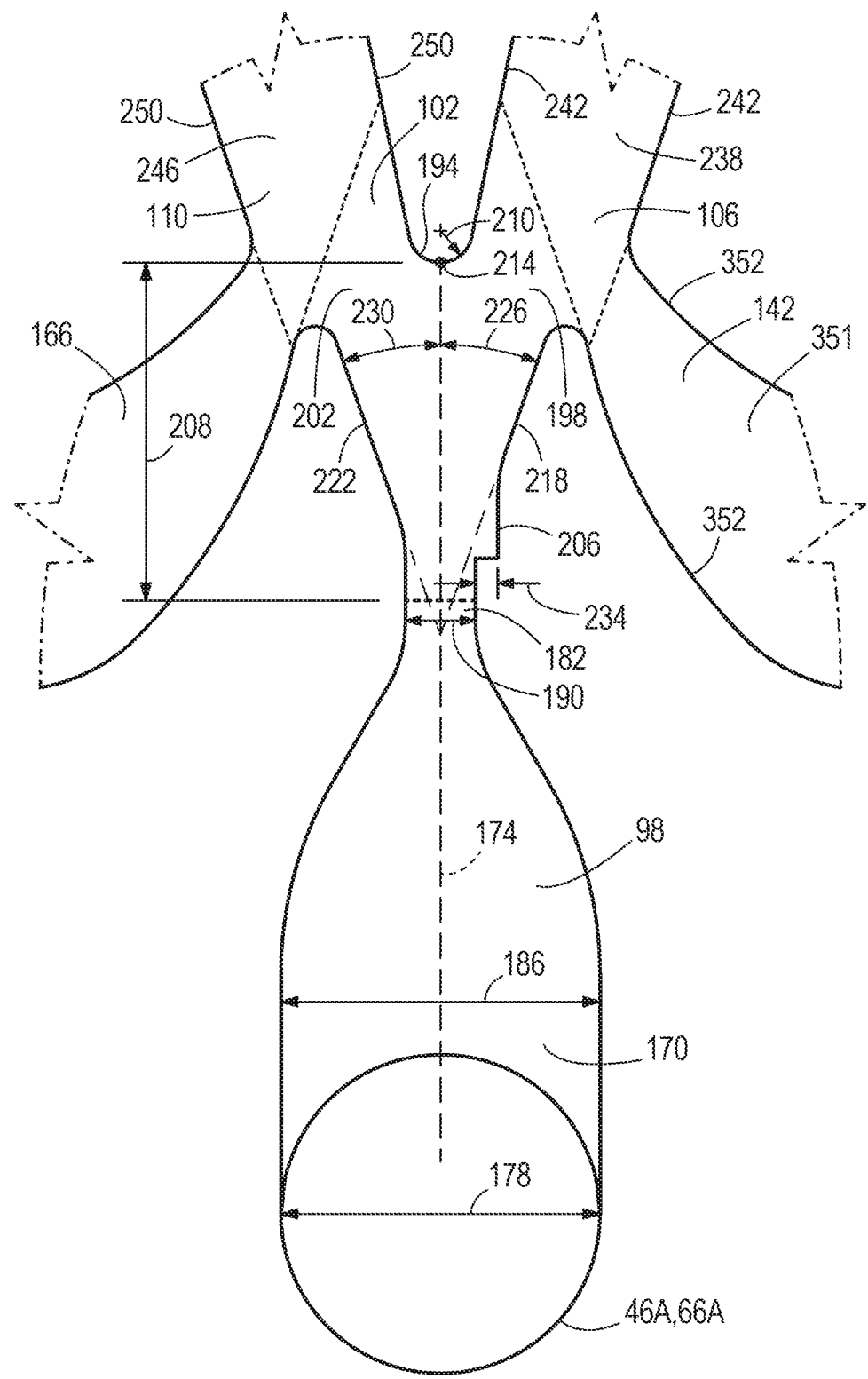
FIG. 6 is an enlarged view of a portion the fluidic switching module of FIG. 5, identified by lines 6-6.

With reference to FIGS. 5-8, the air passage 54 further defines a plurality of "passages," "walls," "dimensions," etc. The first inlet zone 98 includes an inlet passage 170 in fluid communication with the air source connector 46A and defines an inlet air stream axis 174 (FIG. 6). The bore 66A of the air source connector 46A defines a diameter 178 within a range of approximately 1.0 mm to approximately 3.0 mm. The inlet passage 170 narrows downstream to a nozzle 182. In particular, the inlet passage 170 includes an inlet width dimension 186 and the nozzle 182 defines a nozzle width dimension 190 smaller than the inlet width dimension 186. In the illustrated embodiment, the inlet width dimension 186 is equal to the diameter 178. The inlet width dimension 186 is larger than the nozzle width dimension 190 by a factor within a range of approximately 1.25 to approximately 5.5.

With reference to FIG. 6, downstream of the nozzle 182 is the first splitter zone 102. The first splitter zone 102 includes an air splitter 194, a first outlet passage 198, a second outlet passage 202, and a notch 206 (i.e., an airflow biasing feature). The air splitter 194 is positioned from the nozzle 182 a distance 208 of approximately 2.0 mm to approximately 3.0 mm. In some embodiments, the distance 208 is equal to approximately four times the nozzle width 190. The air splitter 194 is curved and defines at least one radius 210. In alternative embodiments, the air splitter is cusped. In other words, the air splitter 194 may be either concave or convex. Specifically, the air splitter 194 includes a center point 214 aligned with the inlet air stream axis 174. The first outlet passage 198 includes a first wall 218 and the second outlet passage 202 includes a second wall 222 positioned opposite the first wall 218. The first wall 218 is oriented with respect to the inlet air stream axis 174 to define a first angle 226. Likewise, the second wall 222 is oriented with respect to the inlet air stream axis 174 to define a second angle 230. Both the first angle 226 and the second angle 230 are within a range of approximately 15 degrees to approximately 25 degrees. In some embodiments, the first angle 226 is equal to the second angle 230.

The notch 206 is positioned upstream of the first outlet passage 198 and downstream of the nozzle 182. More specifically, the notch 206 is positioned between the nozzle 182 and the first wall 218. In other words, the notch 206 replaces a portion of the first wall 218. As explained in further detail below, the notch 206 biases the airflow from the nozzle 182 to initially flow through the first outlet passage 198 before flowing through the second outlet passage 202. The notch 206 defines a dimension 234 that is within a range of approximately 0.025 mm to approximately 0.50 mm. The greater the notch size the greater the biasing effect toward the corresponding output channel 198. However, a notch size too great can create airflow instability. In alternative embodiments, the notch 206 may be a groove, slot, or other suitable geometric feature in the wall 218 to generate an area of low pressure.

With continued reference to FIG. 6, downstream of the first splitter zone 102 are both the first and second transfer zones 106, 110. In particular, the first outlet passage 198 is in fluid communication with the first transfer zone 106. Likewise, the second outlet passage 202 is in fluid communication with the second transfer zone 110. The first transfer zone 106 includes a transfer passage 238 with two curved walls 242 and the second transfer zone 110 similarly includes a transfer passage 246 with two curved walls 250.

Figure 7:
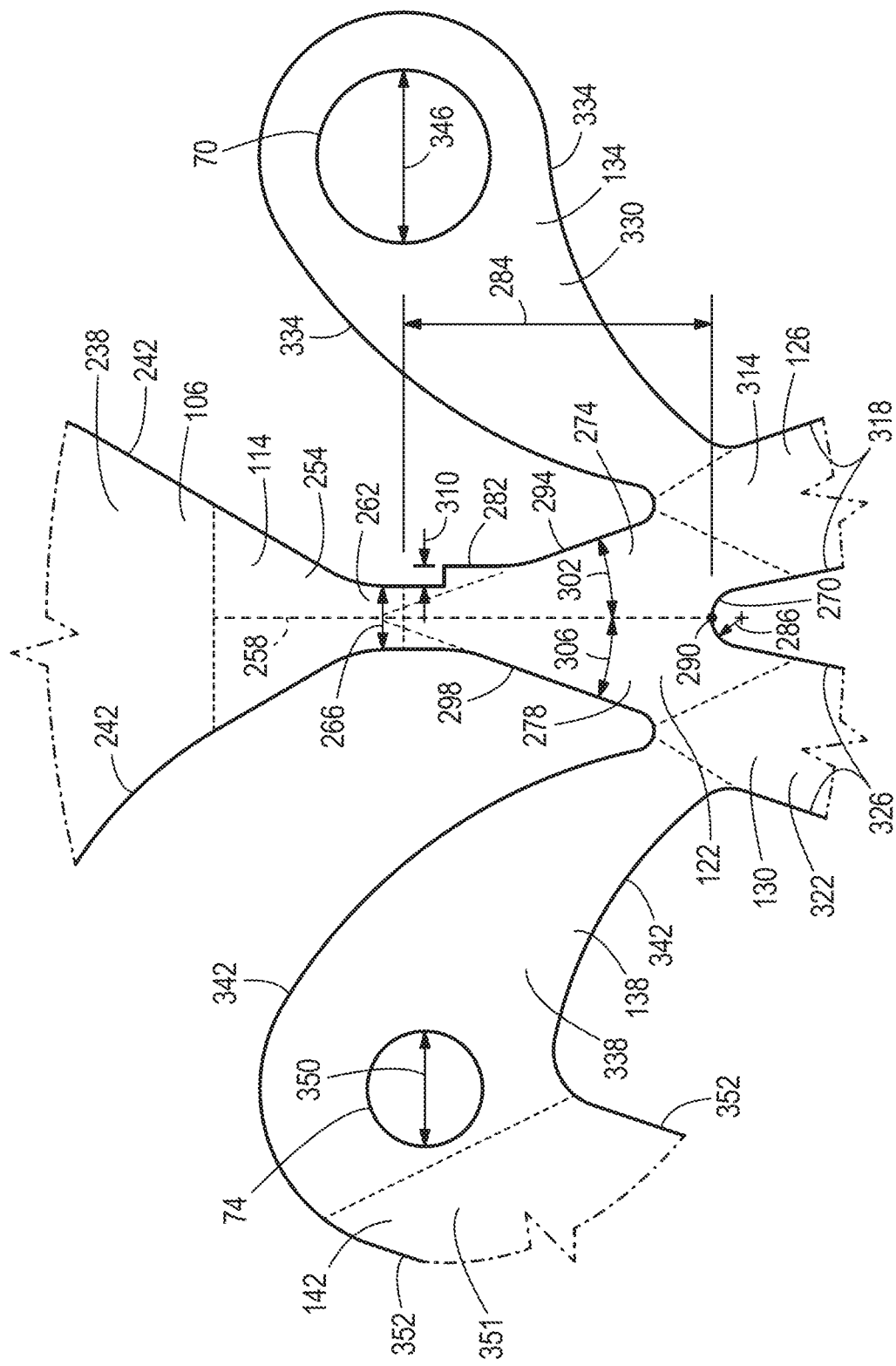
FIG. 7 is an enlarged view of a portion the fluidic switching module of FIG. 5, identified by lines 7-7.

Downstream of the first transfer zone 106 is the inlet zone 114 of the second subsystem 90. With reference to FIG. 7, the transfer passage 238 is in fluid communication with an inlet passage 254 that defines an air stream axis 258. The inlet passage 254 narrows to a nozzle 262 that is narrower than the nozzle 182. In particular, the nozzle 262 defines a nozzle width dimension 266 smaller than the nozzle width 190. The nozzle width dimension 266 is equivalent to or smaller than the nozzle width 190 by a factor within a range of approximately 100% to approximately 50%.

Downstream of the nozzle 262 is the second splitter zone 122. The second splitter zone 122 includes an air splitter 270, a first outlet passage 274, a second outlet passage 278, and a notch 282. The air splitter 270 is positioned from the nozzle 262 a distance 284 of approximately 2.0 mm to approximately 3.0 mm. In some embodiments, the distance 284 is equal to approximately four times the nozzle width 266. The air splitter 270 is curved and defines at least one radius 286. Like the air splitter 194, the air splitter 270 may be either concave or convex. Specifically, the air splitter 270 includes a center point 290 aligned with the inlet air stream axis 258. The first outlet passage 274 includes a first wall 294 and the second outlet passage 278 includes a second wall 298 positioned opposite the first wall 294. The first wall 294 is oriented with respect to the inlet air stream axis 258 to define a first angle 302. Likewise, the second wall 298 is oriented with respect to the inlet air stream axis 258 to define a second angle 306. Both the first angle 302 and the second angle 306 are within a range of approximately 15 degrees to approximately 25 degrees. In some embodiments, the first angle 302 is equal to the second angle 306.

The notch 282 is positioned upstream of the first outlet passage 274. More specifically, the notch 282 is positioned between the nozzle 262 and the first wall 294. In other words, the notch 282 replaces a portion of the first wall 294. The notch 282 defines a dimension 310 that is within a range of approximately 0.025 mm to approximately 0.5 mm. As explained in further detail below, the notch 282 biases the airflow from the nozzle 262 to initially flow through the first outlet passage 274 before flowing through the second outlet passage 278.

Downstream of the second splitter zone 122 are the first bladder zone 126, the second bladder zone 130, the first vent zone 134 and the second vent zone 138. In particular, the first outlet passage 274 is in fluid communication with the first bladder zone 126 and the first vent zone 134. Likewise, the second outlet passage 278 is in fluid communication with the second bladder zone 130 and the second vent zone 138. The first bladder zone 126 includes a passage 314 with two opposing walls 318 and the first bladder connector 46B. Similarly, the second bladder zone 130 includes a passage 322 with two opposing walls 326 and the second bladder connector 46C. The first vent zone 134 includes a passage 330 with two curved walls 334 and the first vent 70. Similarly, the second vent zone 138 includes a passage 338 with two curved walls 342 and the second vent 74. The first vent 70 defines a first vent diameter 346 and the second vent 74 defines a second vent diameter 350.

With reference to FIGS. 6, 7, and 9, the feedback zone 142 includes a feedback passage 351 including two curved walls 352. The feedback passage 254 is in fluid communication with the passage 338 of the second vent zone 138, and is in fluid communication with the transfer passage 238 of the first transfer zone 106. As explained in greater detail below, the feedback zone 142 provides a passive way to switch airflow from the second subsystem 90 to the third subsystem 94.

Figure 8:
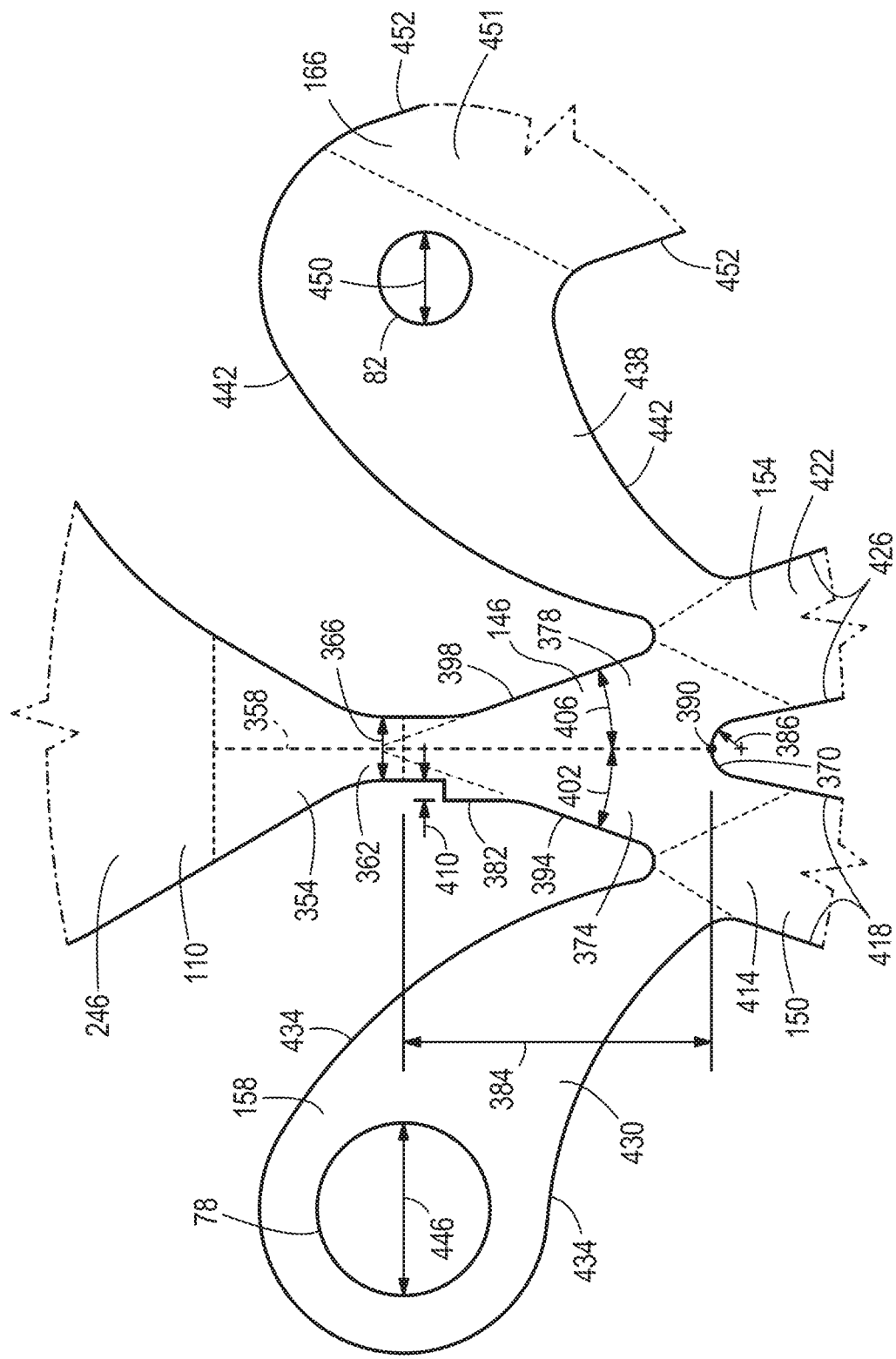
FIG. 8 is an enlarged view of a portion of the fluidic switching module of FIG. 5, identified by lines 8-8.

The third subsystem 94 is similar to the second subsystem 90. In some embodiments, the third subsystem 94 is the same as (i.e., identical to) the second subsystem 90. Downstream of the second transfer zone 110 is the inlet zone 118 of the third subsystem 94. With reference to FIG. 8, the transfer passage 246 is in fluid communication with an inlet passage 354 that defines an air stream axis 358. The inlet passage 354 narrows to a nozzle 362 that is narrower than the nozzle 182. In particular, the nozzle 362 defines a nozzle width dimension 366 smaller than the nozzle width 190. The nozzle width dimension 366 is equivalent to or smaller than the nozzle width 190 by a factor within a range of approximately 100% to approximately 50%.

Downstream of the nozzle 362 is the third splitter zone 146. The third splitter zone 146 includes an air splitter 370, a first outlet passage 374, a second outlet passage 378, and a notch 382. The air splitter 370 is positioned from the nozzle 362 a distance 384 of approximately 2.0 mm to approximately 3.0 mm. In some embodiments, the distance 384 is equal to approximately four times the nozzle width 366. The air splitter 370 is curved and defines at least one radius 386. Like the air splitter 270, the air splitter 370 may be either concave or convex. Specifically, the air splitter 370 includes a center point 390 aligned with the inlet air stream axis 358. The first outlet passage 374 includes a first wall 394 and the second outlet passage 378 includes a second wall 398 positioned opposite the first wall 394. The first wall 394 is oriented with respect to the inlet air stream axis 358 to define a first angle 402. Likewise, the second wall 398 is oriented with respect to the inlet air stream axis 358 to define a second angle 406. Both the first angle 402 and the second angle 406 are within a range of approximately 15 degrees to approximately 25 degrees. In some embodiments, the first angle 402 is equal to the second angle 406.

The notch 382 is positioned upstream of the first outlet passage 374. More specifically, the notch 382 is positioned between the nozzle 362 and the first wall 394. In other words, the notch 382 replaces a portion of the first wall 394. The notch 382 defines a dimension 410 that is within a range of approximately 0.025 mm to approximately 0.5 mm. As explained in further detail below, the notch 382 biases the airflow from the nozzle 362 to initially flow through the first outlet passage 374 before flowing through the second outlet passage 378.

Downstream of the third splitter zone 146 are the third bladder zone 150, the fourth bladder zone 154, the third vent zone 158 and the fourth vent zone 162. In particular, the first outlet passage 374 is in fluid communication with the third bladder zone 150 and the third vent zone 158. Likewise, the second outlet passage 378 is in fluid communication with the fourth bladder zone 154 and the fourth vent zone 162. The third bladder zone 150 includes a passage 414 with two opposing walls 418 and the third bladder connector 46D. Similarly, the fourth bladder zone 154 includes a passage 422 with two opposing walls 426 and the fourth bladder connector 46E. The third vent zone 158 includes a passage 430 with two curved walls 434 and the third vent 78. Similarly, the fourth vent zone 162 includes a passage 438 with two curved walls 442 and the fourth vent 82. The third vent 78 defines a third vent diameter 446 and the fourth vent 82 defines a fourth vent diameter 450.

The feedback zone 166 includes a feedback passage 451 including two curved walls 452. The feedback passage 451 is in fluid communication with the passage 438 of the fourth vent zone 162, and is in fluid communication with the transfer passage 246 of the second transfer zone 110. As explained in greater detail below, the feedback zone 166 provides a passive way to switch airflow from the third subsystem 94 to the second subsystem 90.

In operation, the pump 14 provides a source of pressurized air at the air connector 46A. The air passage 54 passively controls the source of pressurized air to cyclically and sequentially inflate and deflate the bladders 18, 22, 26, 30. In other words, the air passage 54 inflates and deflates each of the bladders 18, 22, 26, 30 in a predetermined sequence with no additional electrical or mechanical valves, switches, or other external controls. In the illustrated embodiment, the predetermined sequence includes out of unison inflation of each of the bladders 18, 22, 26, 30 (i.e., inflating the first bladder first, and then inflating the second bladder, and then inflating the third bladder, etc.).

With reference to FIG. 10A, pressurized air from the pump 14 is received by the fluidic switching module 34 and enters the inlet passage 170 of the air passage 54. The pressure in the input passage 170 (i.e., the inlet pressure) dictates the maximum output pressure and output flow rate possible to the bladders 18, 22, 26, 30. The airflow accelerates as the inlet passage 170 narrows to form the nozzle 182. An air velocity too fast creates excessive turbulence, which degrades operation and stability of the module 34.

As the pressurized air exits the nozzle 182, the airflow contacts the first air splitter 194. The first splitter 194 divides the airflow between one of the two outlet passages 198, 202. Initially, a low pressure field develops along both of the adjacent angled walls 218, 222 due to entrainment of the surrounding air. However, the low pressure fields developing along both of the adjacent angle walls 218, 222 are different as a result of the notch 206 in the first wall 218. In particular, the low pressure field along the first wall 218 is stronger than the low pressure field along the second wall 222. The difference in low pressure fields deflects the airflow toward the first wall 218 with the biasing notch 206 and the corresponding first outlet passage 198. The physical phenomenon that causes the airflow to attach to one of the two walls 218, 222 is known as the Coanda effect. The Coanda effect is the tendency of a jet of fluid emerging from an orifice (e.g., the nozzle 182) to follow an adjacent flat or curved surface (e.g., the wall 218) and to entrain fluid from the surroundings. As such, the airflow initially flows from the first air splitter 194 to the second subsystem 90. The angles 226, 230 of the walls 218, 222 (FIG. 6) with respect to the airflow centerline 174 are designed to control the strength of the low pressure fields and the point at which the airstream attaches to the walls 218, 222 downstream.

With continued reference to FIG. 10A, as the airflow moves through the transfer passage 238, the airflow initially draws in an additional inflow of air through the feedback passage 351 due to the Venturi effect. Specifically, additional airflow is drawn into the transfer passage 238 from the vent 74. However, when the transfer passage 238 reaches approximately 15% to approximately 25% of the input pressure at the nozzle 182, the airflow through the feedback passage 351 reverses to flow towards the vent 74. In other words, airflow through the transfer passage 238 initially creates a Venturi effect, drawing in additional airflow through the feedback passage 351, until the pressure in the transfer passage 238 reaches a threshold (e.g., approximately 28% of the inlet pressure). As such, this variable direction airflow is illustrated in FIG. 10A as a double sided arrow (i.e., initially flowing towards the transfer passage 238 and then flowing towards the second vent passage 338). The transfer passage 238 reaches and temporarily stabilizes at approximately 40% to approximately 60% of the input pressure, and provides a temporarily stable inlet pressure to the second subsystem 90.

With continued reference to FIG. 10A, the second air splitter 270 of the second subsystem 90 operates in much the same way as the first air splitter 194 of the first subsystem 86. In particular, low pressure fields develop along both of the adjacent angled walls 294, 298 due to entrainment of the surrounding air. The differential between the low pressure fields develops because of the biasing notch 282, and the air stream from the nozzle 262 deflects toward the angled wall 294 and the first outlet passage 274. In other words, a stronger low pressure area forms on the wall 294 with the notch 282, biasing the airflow in that direction. As before, wall attachment occurs due to the Coanda effect and the airflow is directed toward the first bladder output passage 314, inflating the first bladder 18.

As the first bladder 18 starts inflating, additional air is drawn into the first bladder passageway 314 from the first vent passage 330 due to the Venturi effect. The additional airflow from the vent 70 due to the Venturi effect increases the airflow in the passage 314 by a factor of approximately 1.0 to approximately 1.1. When the first bladder 18 reaches approximately 50% of the max pressure, the airflow in the first vent passage 330 reverses. As such, the airflow through first vent passage 330 is illustrated in FIG. 10A as a double-sided arrow. The first bladder 18 reaches a maximum pressure at approximately one-third of the input pressure. When the first bladder 18 reaches the maximum pressure, the airflow at the second air splitter 270 is deflected and the airflow switches to the second output passage 278 and the second bladder passage 322, corresponding to the second bladder 22.

Figure 10B:
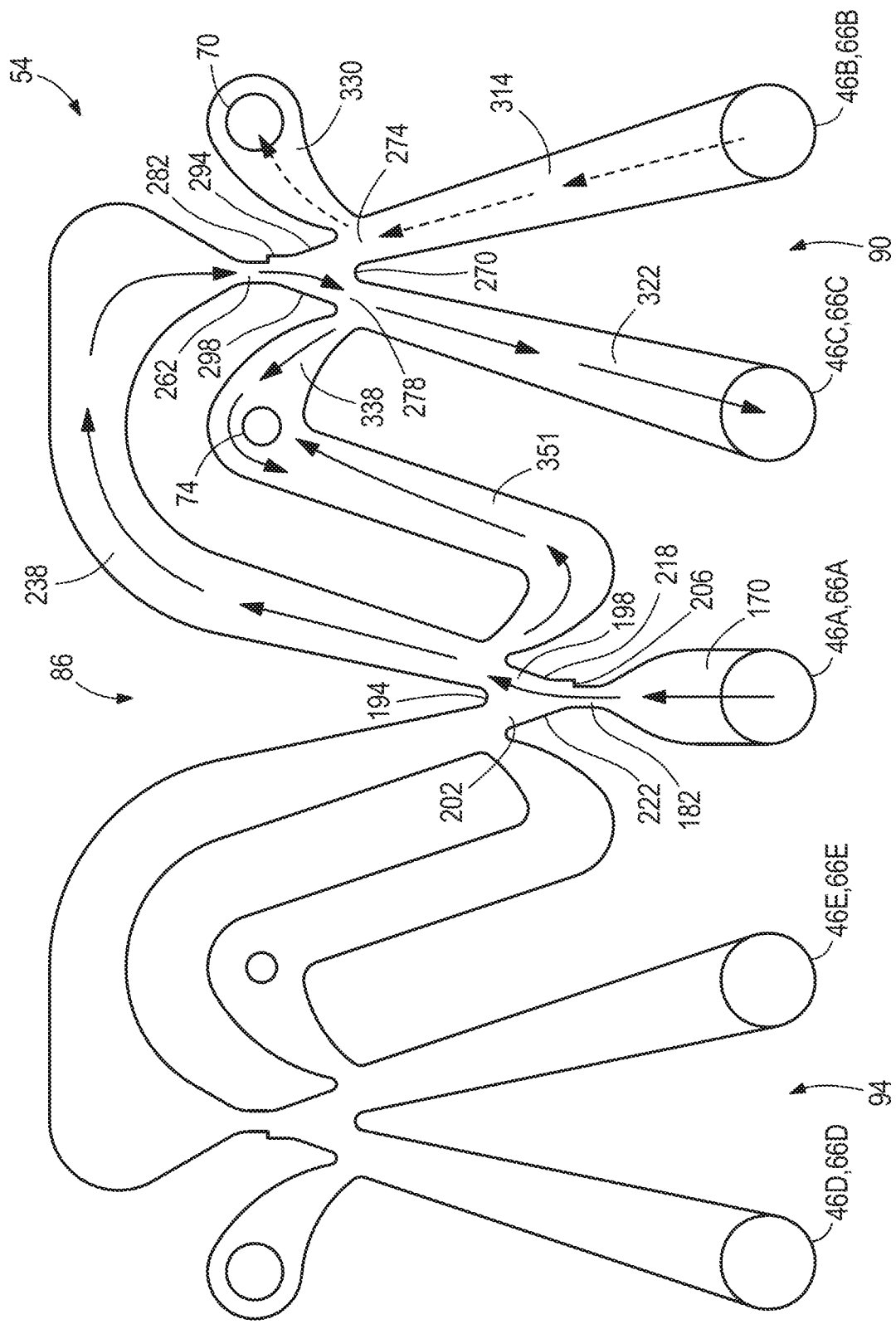

With reference to FIG. 10B, backpressure from the inflated first bladder 18 causes the airflow at the second air splitter 270 to switch and deflect towards the second outlet passage 278. In the state shown in FIG. 10B, the first bladder 18 now begins to deflate through the first vent passage 330 and the first vent 70 and the second bladder 22 begins to inflate. As the second bladder 22 inflates, feedback to the first subsystem 86 occurs through an increase in the pressure in the feedback passage 351, which is connected between the second vent passage 338 and the first transfer passage 238. When the second bladder 22 reaches a pressure of approximately 35% to approximately 50% of the input pressure, the pressure in the feedback passage 351 is high enough to cause the airflow at the first air splitter 194 to switch and deflect towards the second outlet passage 202. In other words, when the pressure in the second bladder 22 reaches a threshold, the pressure feedback through the feedback passage 351 causes the airflow at the first air splitter 194 to defect and switch to the second output passage 202, corresponding to the third subsystem 94.

Figure 10C:
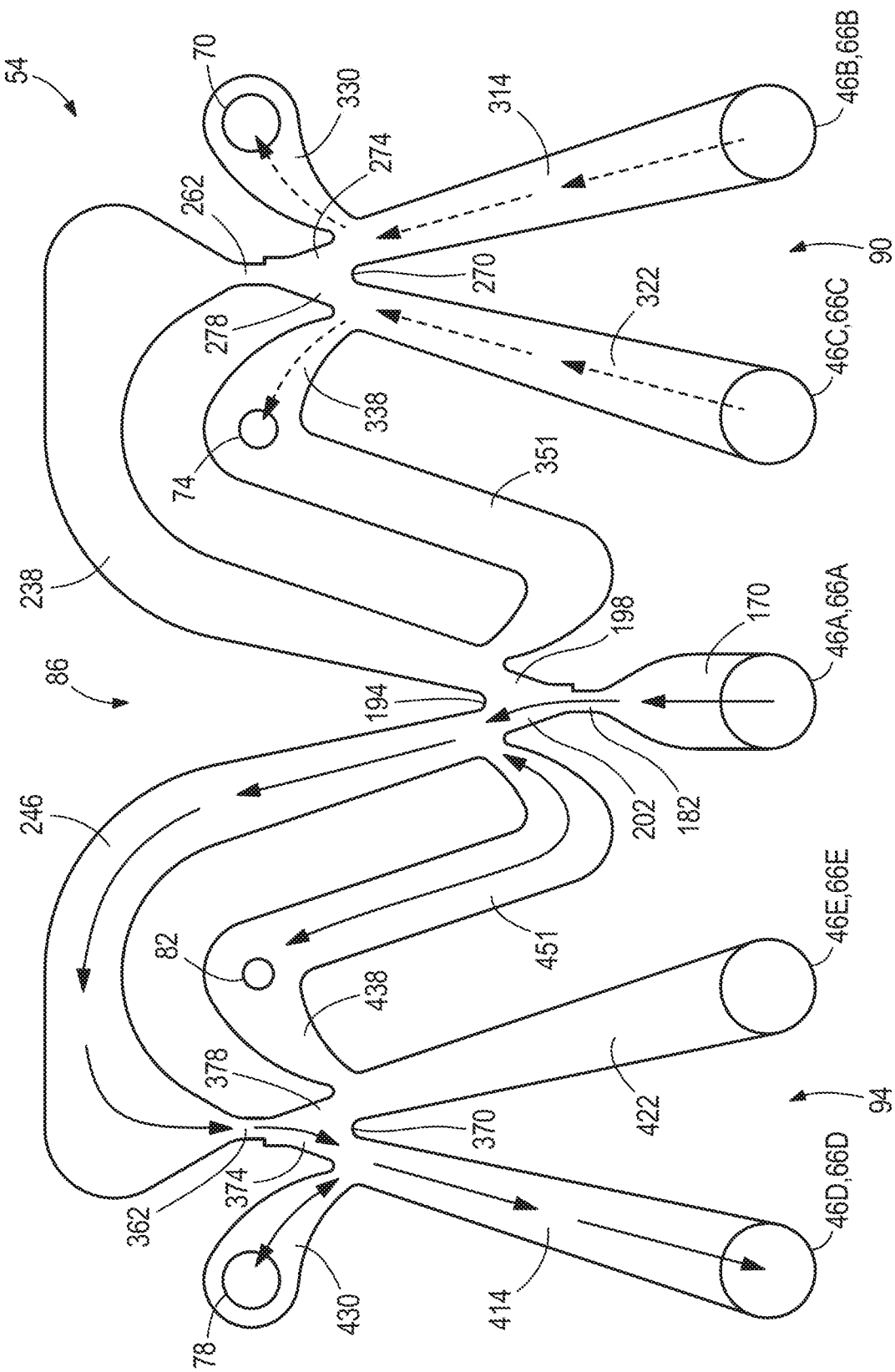

With reference to FIG. 10C, with both the first bladder 18 and the second bladder 22 deflating (illustrated with dashed arrows), the airflow is deflected at the first air splitter 194 to move through the transfer passage 110 toward the third subsystem 94. As air moves through the transfer passage 110, the airflow initially draws in an additional inflow of air through the feedback passage 451 due to the Venturi effect. However, when the transfer passage 246 reaches approximately 15% to approximately 25% of the input pressure, the airflow through the feedback passage 451 reverses to flow towards the vent 82. In other words, airflow through the transfer passage 246 initially creates a Venturi effect, drawing in additional airflow through the feedback passage 451, until the pressure in the transfer passage 246 reaches a threshold. As such, this variable airflow is illustrated in FIG. 10C as a double sided arrow (i.e., initially flowing towards the transfer passage 246 and then flowing towards the fourth vent passage 438). The transfer passage 246 reaches and temporarily stabilizes at approximately 40% to approximately 60% of the input pressure, and provides a temporarily stable inlet pressure to the third subsystem 94.

With continued reference to FIG. 10C, the third air splitter 370 of the third subsystem 94 operates in much the same way as the second air splitter 270 of the second subsystem 90. In particular, low pressure fields develop along both of the adjacent angled walls 394, 398 due to entrainment of the surrounding air. The differential between the low pressure fields develops because of the biasing notch 382, and the air stream from the nozzle 362 deflects toward the angled wall 394 and the first outlet passage 374. In other words, a stronger low pressure area forms on the wall 394 with the notch 382, biasing the airflow in that direction. As before, wall attachment occurs due to the Coanda effect and the airflow is directed toward the third bladder output passage 414, inflating the third bladder 26.

As the third bladder 26 starts inflating, additional air is drawn into the third bladder passageway 414 from the third vent passage 430 due to the Venturi effect. The additional airflow from the third vent 78 due to the Venturi effect increases the airflow in the passage 414 by a factor of approximately 1.0 to approximately 1.1. When the third bladder 26 reaches approximately 50% of the max pressure, the airflow in the third vent passage 430 reverses. As such, the airflow through the third vent passage 430 is illustrated in FIG. 10C as a double-sided arrow. The third bladder 26 reaches a maximum pressure at approximately one-third of the input pressure. When the third bladder 26 reaches the maximum pressure, the airflow at the third air splitter 370 is deflected and the airflow switches to the second output channel 378 and the fourth bladder passage 422, corresponding to the fourth bladder 30.

Figure 10D:
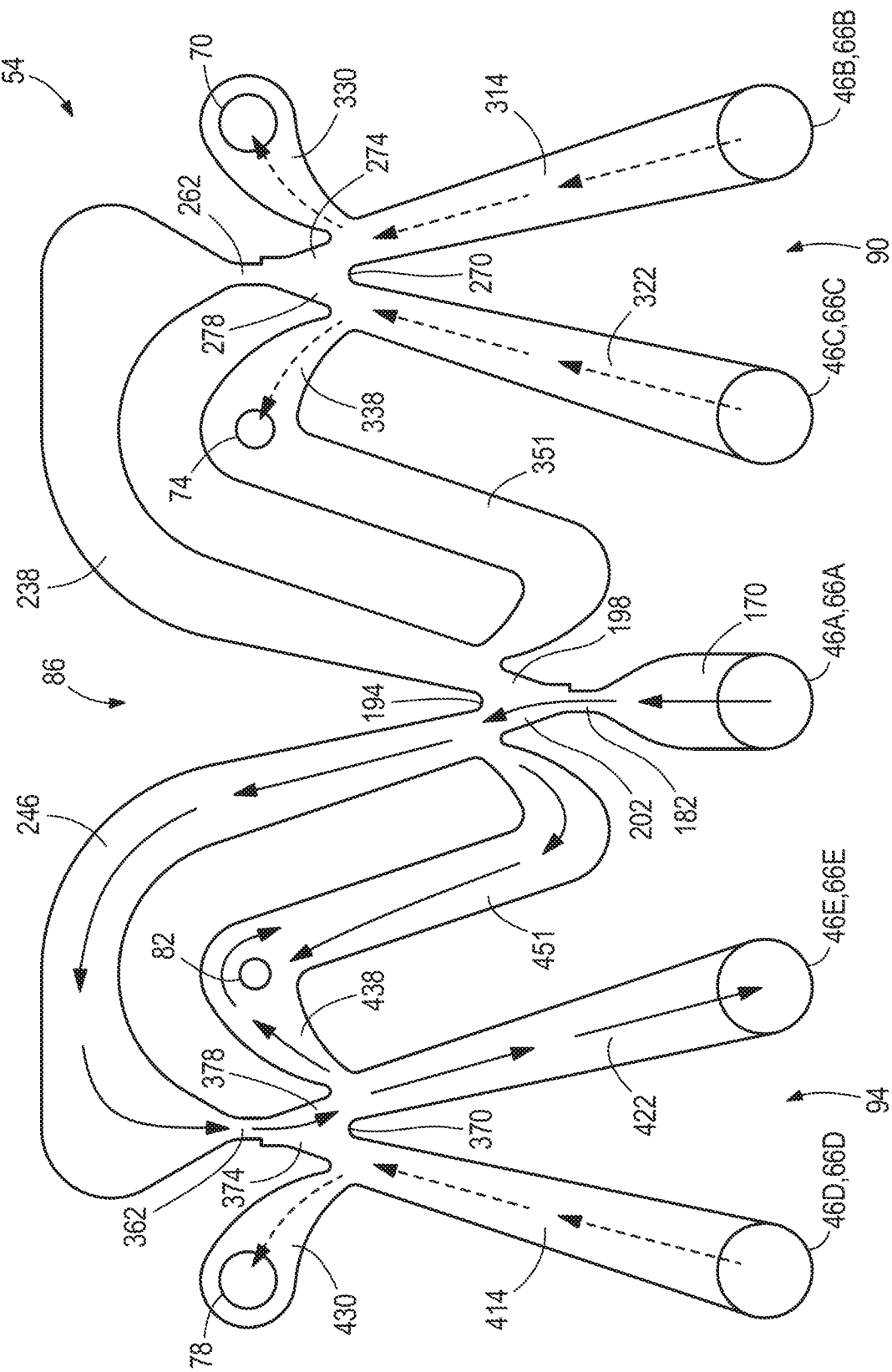

With reference to FIG. 10D, backpressure from the third bladder 26 causes the airflow at the third air splitter 370 to deflect towards the second outlet passage 378. In the state shown in FIG. 10D, the third bladder 26 deflates through the third vent 78 and the fourth bladder 30 is inflating. As the fourth bladder 30 inflates, feedback to the first subsystem 86 occurs through an increase in the pressure in the feedback passage 451, which is connected between the fourth vent passage 438 and the second transfer passage 246. When the fourth bladder 30 reaches a pressure of approximately 35% to approximately 50% of the input pressure, the pressure in the feedback passage 451 is high enough to cause the airflow at the first air splitter 194 to switch back to flowing towards the first outlet passage 198. In other words, when the pressure in the fourth bladder 30 reaches a threshold, the feedback through the feedback passage 451 causes the airflow at the first air splitter 194 to defect and switch to the first output channel 198, corresponding to the second subsystem 90.

Figure 10E:
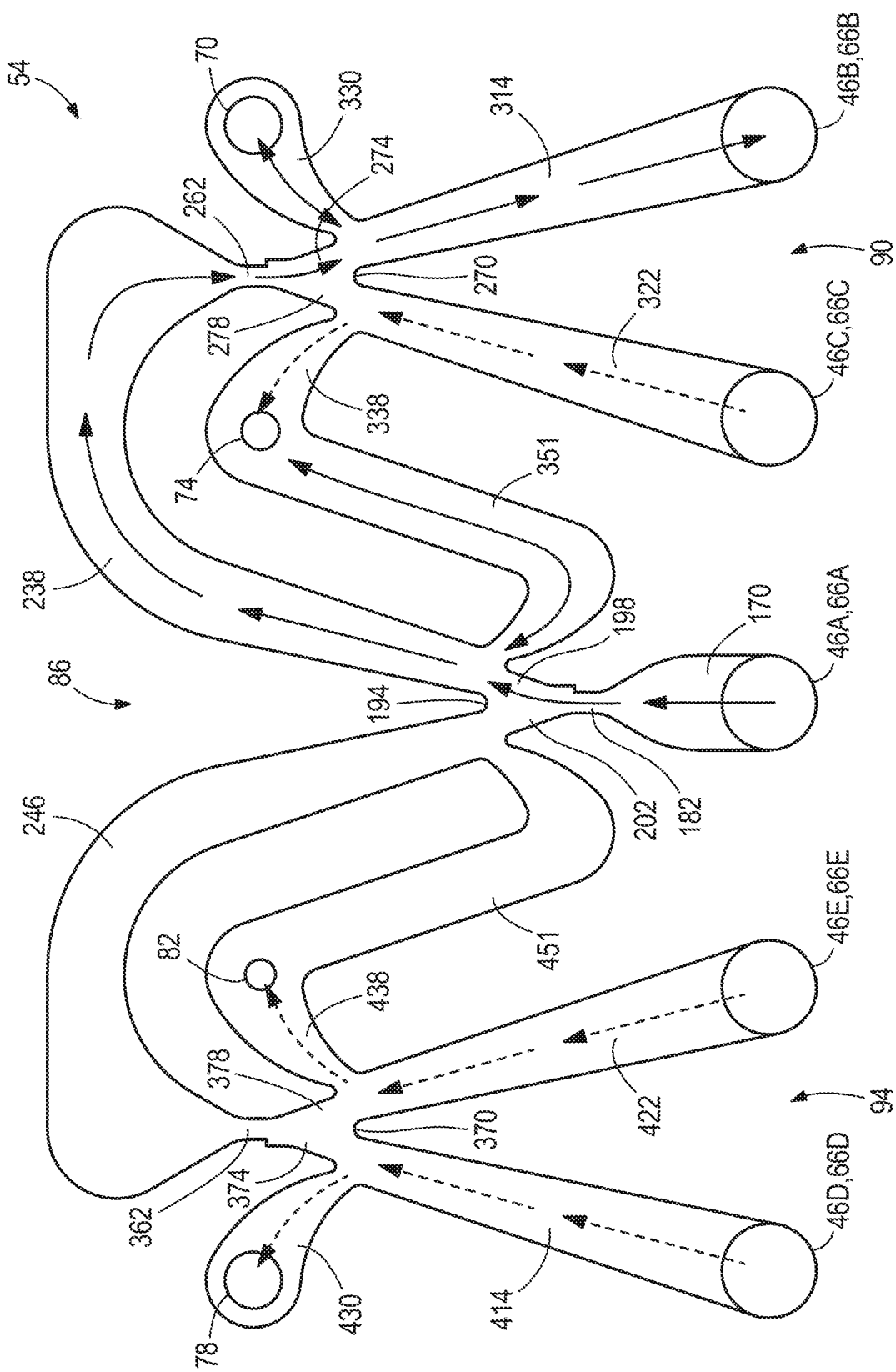

With reference to FIG. 10E, the operation of the fluidic module 34 begins another cycle of inflating and deflating the bladders 18, 22, 26, 30. In particular, the state shown in FIG. 10E is similar to the state shown in FIG. 10A in that airflow is biased to inflate the first bladder 18. However, FIG. 10E differs in that the remaining bladders 22, 26, 30 are deflating while the first bladder 18 is inflating. The inflation and deflation of the bladders 18, 22, 26, 30 continues as long as there is an inlet pressure provided at the air connector 46A. In other words, the cyclical inflation and deflation of the bladders 18, 22, 26, 30 repeats indefinitely in the predefined sequence until the pressurized air source 14 is turned off. As such, the fluidic module 34 provides a defined sequential continuous massage effect via inflation and deflation of bladders 18, 22, 26, 30 when a pressurized air is supplied to the inlet connector 46A.

In contrast, conventional pneumatic massage systems in automobile seats use a pneumatic pump that supplies pressurized air to an electro-mechanical valve module that controls the massage sequence and cycle time according to a predefined massage program. Each independent bladder requires a separate electro-mechanical valve within the module to control the inflation and deflation. Basic massage systems typically have three bladders, while high end massage systems can have up to twenty bladders. Due to the complexity and the electronics required to control them, the cost of an electro-mechanical module is expensive. This makes it difficult, for example, to outfit lower-cost vehicles with massage. In other words, prior art designs include modules that are very complex and need communication with vehicle electronic systems, which increases the development and production costs.

In contrast, the fluidic module 34 does not rely on the use of electronics or moving mechanical components for operation or control. This makes the module 34 reliable, repeatable, and cost efficient. A defined massage sequence (i.e., cyclical inflation/deflation of the bladders 18, 22, 26, 30) is achieved through the use of cascading vented fluidic amplifiers (i.e., subsystems 86, 90, 94) that are biased to follow a defined sequence or order. The sequence is further defined by the use of feedback zones 146, 166 that force switching of the airflow at predefined static pressures. The vented fluidic amplifiers were chose to eliminate sensitivity to false switching under load and also provide the additional benefit of providing a passage for automatic deflation when the operation of the pneumatic system 10 has completed.

Figure 11:
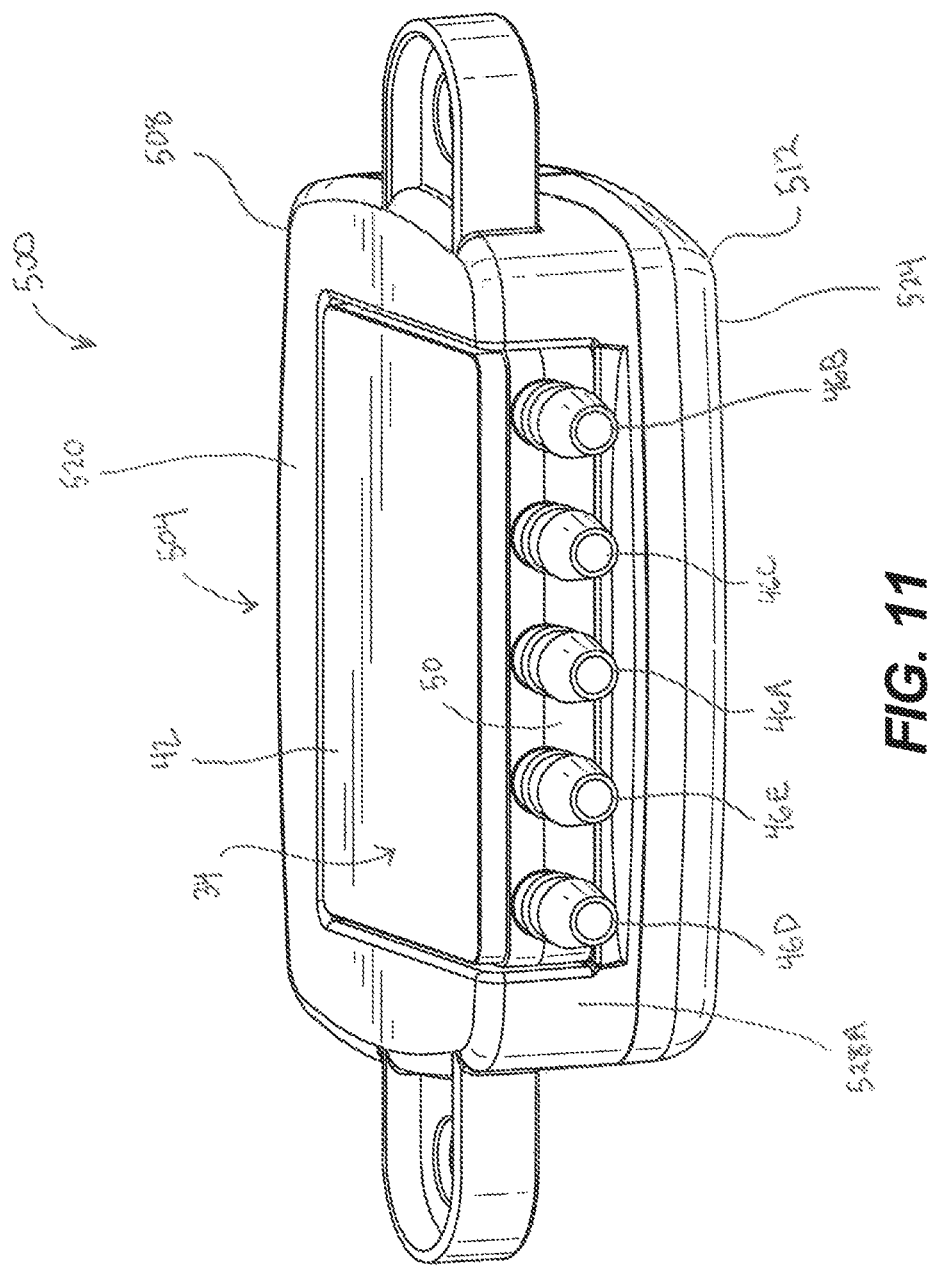
FIG. 11 is a perspective view of an assembly including the fluidic switching module of FIG. 1 coupled to a sound attenuator.
Figure 12:
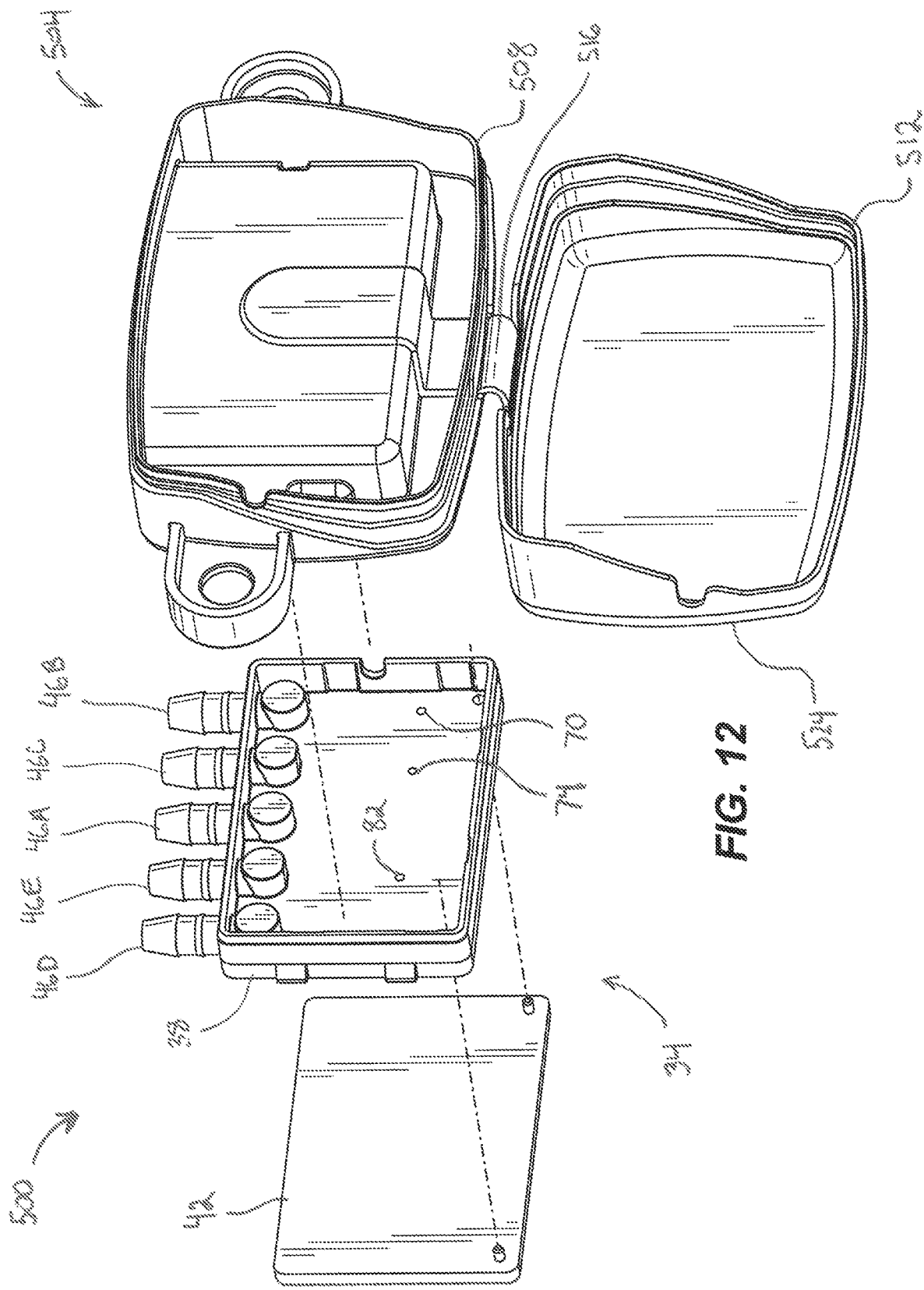
FIG. 12 is an exploded view of the assembly of FIG. 11.

FIGS. 11 and 12 illustrate an assembly 500 including the fluidic module 34 and a sound attenuator 504 according to one embodiment. As described in greater detail below, the sound attenuator 504 may reduce noise generated by air flowing through the fluidic module 34 during operation of the pneumatic system 10. The assembly 500 may be advantageously used in applications of the pneumatic system 10 (e.g., in vehicle seats, massage chairs, etc.) where quieter operation is desirable.

The illustrated sound attenuator 504 includes a main body 508 and a lid 512 movably coupled to the main body 508. The lid 512 is pivotally coupled to the main body 508 by a hinge 516 such that the lid 512 is pivotally movable relative to the main body 508 between an open position (FIG. 12) and a closed position (FIG. 11). The main body 508 and the lid 512 are integrally formed together as a single component, and the hinge 516 is a living hinge (i.e. a thin strip of resiliently deformable material). As such, the main body 508, the lid 512, and the hinge 516 may be molded together in a single process. This advantageously reduces the cost of manufacturing and assembling the sound attenuator 504.

In other embodiments, the main body 508 and the lid 512 may be separate components coupled together by the hinge 516, or the lid 512 may be removably coupled to the main body 508. In some embodiments, the lid 512 may be fixed to the main body 508 in the closed position by an adhesive, welding (e.g., ultrasonic or hot-air welding), mechanical structures, or the like, such that the lid 512 may not be re-openable. In yet other embodiments, the lid 512 may be integrally formed with the main body 508 in the closed position.

Figure 13:
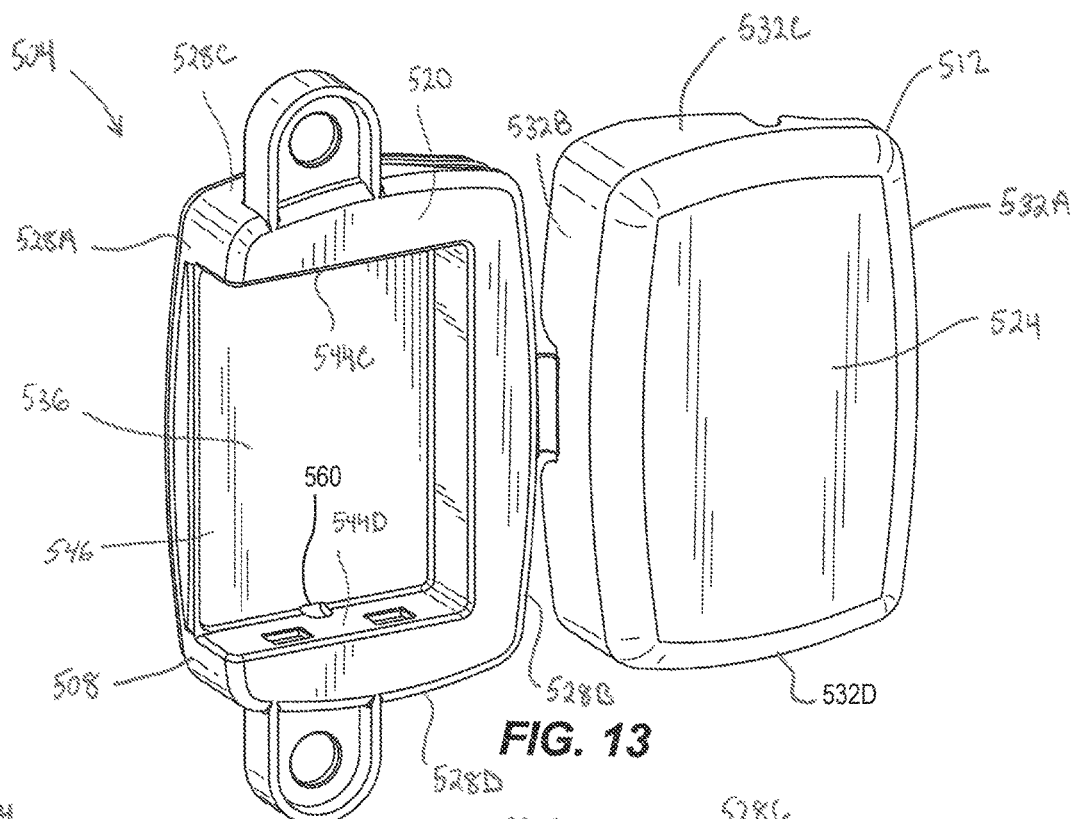
FIG. 13 is a perspective view of the sound attenuator of FIG. 11.
Figure 14:
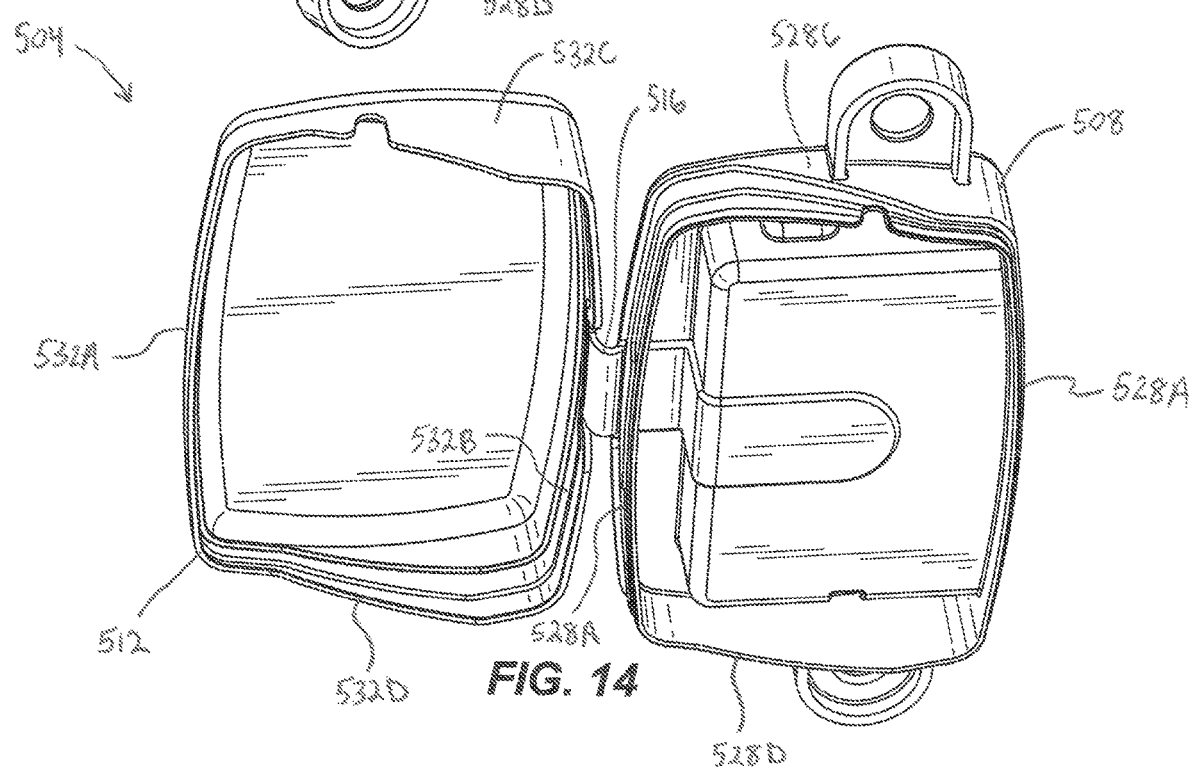
FIG. 14 is another perspective view of the sound attenuator of FIG. 11.

The main body 508 of the sound attenuator 504 includes a first or top wall 520, and the lid 512 includes a second or bottom wall 524 opposite the top wall 520 when the lid 512 is in the closed position, as illustrated in FIG. 11. The main body 508 has first, second, third, and fourth side walls or outer side walls 528A, 528B, 528C, 528D that extend from the top wall 520, and the lid 512 likewise has first, second, third, and fourth side walls or outer side walls 532A, 532B, 532C, 532D that extend from the bottom wall 524 (FIGS. 13-14). The first side walls 528A, 532A (or front side walls) are positioned opposite the second side walls 528B, 532B (or rear side walls). The third side walls 528C, 532C are positioned opposite the fourth side walls 528D, 532D. The first side walls 528A, 532A, the second side walls 528B, 532B, the third side walls 528C, 532C, and the fourth side walls 528D, 532D are generally aligned (i.e. the outer surfaces of each pair of side walls are generally flush) when the lid 512 is in the closed position (FIG. 11).

The main body 508 includes a recess 536 in the top wall 520 that opens through the front wall 528A. The fluidic module 34 is received in the recess 536 and fixed within the recess 536 by a snap fit. The fluidic module 34 may be coupled to the recess 536 in other ways (e.g., a friction fit, one or more fasteners, adhesives, or the like) in other embodiments. In the illustrated embodiment, the recess 536 is sized and shaped such that the cover 42 of the fluidic module 34 is generally aligned with the top wall 520 of the main body 508 (i.e. an outer surface of the cover 42 is generally flush with an outer surface of the top wall 520). In addition, the air connections 46A-46E project beyond the front wall 528A for accessibility and ease of connection (e.g., to the pneumatic source 14 and the bladders 18, 22, 26, 30 illustrated in FIG. 1).

Figure 15:
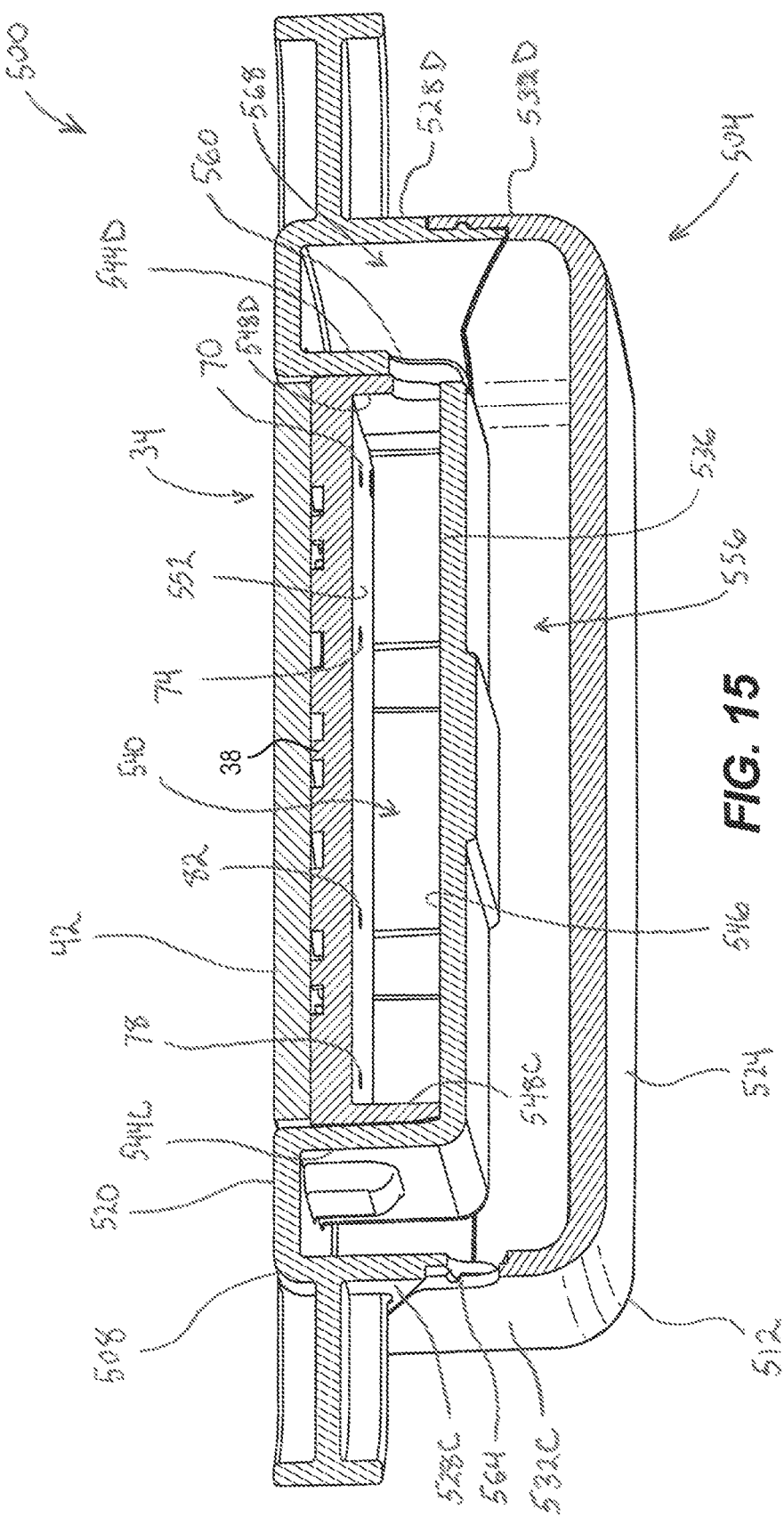
FIG. 15 is a cross-sectional view of the assembly of FIG. 11, taken along line 15-15.

Referring to FIG. 15, the base 38 of the fluidic module 34 and the recess 536 collectively define a first chamber 540. The first chamber 540 has a length and a width generally equal to the length and width of the base 38 of the fluidic module 34. The first chamber 540 is in fluid communication with each of the vents 70, 74, 78, 82 of the fluidic module 34. As such, air from the first chamber 540 may be drawn in through any of the vents 70, 74, 78, 82 during operation of the fluidic module 34, and air may likewise be discharged from any of the vents 70, 74, 78, 82 into the first chamber 540 during operation of the fluidic module 34. Thus, the first chamber 540 is in fluid communication with the air passage 54 of the fluidic module 34 via the vents 70, 74, 78, 82.

The recess 536 is bounded by inner side walls 544C, 544D of the main body 508 that extend generally from the front wall 528A toward the rear wall 528B, and a floor 546 extending between the inner side walls 544C-D. The base 38 of the fluidic module 34 includes corresponding side walls 548C, 548D that extend from an underside 552 of the base 38 and abut the inner side walls 544C-D within the recess 536 (FIG. 15). The side walls 528A-D of the main body 508 and the side walls 532A-D of the lid 512 are spaced apart from the inner side walls 544C-D such that the side walls 528A-D, 532A-D surround the inner side walls 544C-D and define a second chamber 556 therebetween. In the illustrated embodiment, the second chamber 556 partially surrounds the first chamber 540 and also extends between the floor 546 and the bottom wall 524. In other embodiments, the second chamber 556 may completely surround the first chamber 540 on all sides.

With continued reference to FIG. 15, the second chamber 556 is in fluid communication with the first chamber 540 via a first orifice 560 that extends through the side walls 544D, 548D. That is, air may flow between the first chamber 540 and the second chamber 556 through the first orifice 560. A second orifice 564 extends through the third side walls 528C, 532C. In the illustrated embodiment, the second orifice 564 is partially defined by each of the main body 508 and the lid 512. In other embodiments, the second orifice 564 may be provided entirely on the main body 508 or entirely on the lid 512. The second orifice 564 is in fluid communication with the ambient environment surrounding the assembly 500. That is, air may flow between the ambient environment and the second chamber 556 through the second orifice 564.

In operation, the pneumatic source 14 provides pressurized air to the fluidic switching module 34, which inflates and deflates each of the bladders 18, 22, 26, 30 in a predetermined sequence generally as described above (FIG. 1). As the bladders 18, 22, 26, 30 are inflated and deflated, air may be drawn in or exhausted out through the vents 70, 74, 78, 82. As illustrated in FIG. 16, when air is exhausted out through one or more of the vents 70, 74, 78, 82, it enters the first chamber 540. When pressure within the first chamber 540 exceeds pressure in the second chamber 556, air from the first chamber 540 flows through the first orifice 560 and into a first portion 568 of the second chamber 556, between the inner side wall 544D and the outer side walls 528D, 532D.

With continued reference to FIG. 16, the first orifice 560 is perpendicularly oriented with respect to each of the vents 70, 74, 78, 82, which causes the airflow to change direction by about 90 degrees when flowing from the vents 70, 74, 78, 82 to the first orifice 560. The air then flows from the first portion 568 of the second chamber 556 into a second portion 572 of the second chamber 556 that extends below the first chamber 540. This again causes the airflow to change direction by about 90 degrees. The airflow changes direction for a third time by about 90 degrees upon entering a third portion 576 of the second chamber 556 that is between the inner side wall 544C and the side walls 532C, 528C. Finally, the air is exhausted to the ambient environment through the second orifice 564.

The chambers 540, 556 and orifices 560, 564 thus define a tortuous flow path for air being exhausted from the fluid switching module 34 via the vents 70, 74, 78, 82. If air is drawn in through one or more of the vents 70, 74, 78, 82, then the flow path described above and illustrated in FIG. 16 is reversed.

The sound attenuator 504 is made of a relatively flexible plastic material, such as polypropylene. For example, in some embodiments, the sound attenuator 504 is made of a plastic material having a flexural modulus under ASTM D790 between about 1.0 megapascals (MPa) and about 3.0 MPa. In some embodiments, the plastic material may have a flexural modulus under ASTM D790 between about 1.0 MPa and about 2.0 MPa. This corresponds with relatively high flexibility, which advantageously provides the sound attenuator 504 with desirable resonating properties.

For example, in the illustrated embodiment, the first chamber 540 has a first volume and the second chamber 564 has a second volume that is greater than the first volume. As such, the first chamber is configured to resonate at a relatively high, first resonant frequency (e.g., above 500 Hertz (Hz) in some embodiments) and the second chamber 556 is configured to resonate at a lower, second resonant frequency (e.g., below 500 Hz). In some embodiments, the first resonant frequency is at least 10% higher than the second resonant frequency. As airflow passes through the orifices 560, 564 and the chambers 540, 556 during operation, the differing resonances of the chambers 540, 556 produces destructive interference that attenuates the sound produced by air flowing along the airflow path 54 of the fluidic switching module 34. This is accomplished without any active noise cancelling or absorbent materials (e.g., foam, baffles, etc.) lining the airflow path, which would tend to increase flow resistance and decrease flow rate.

Figure 17A:
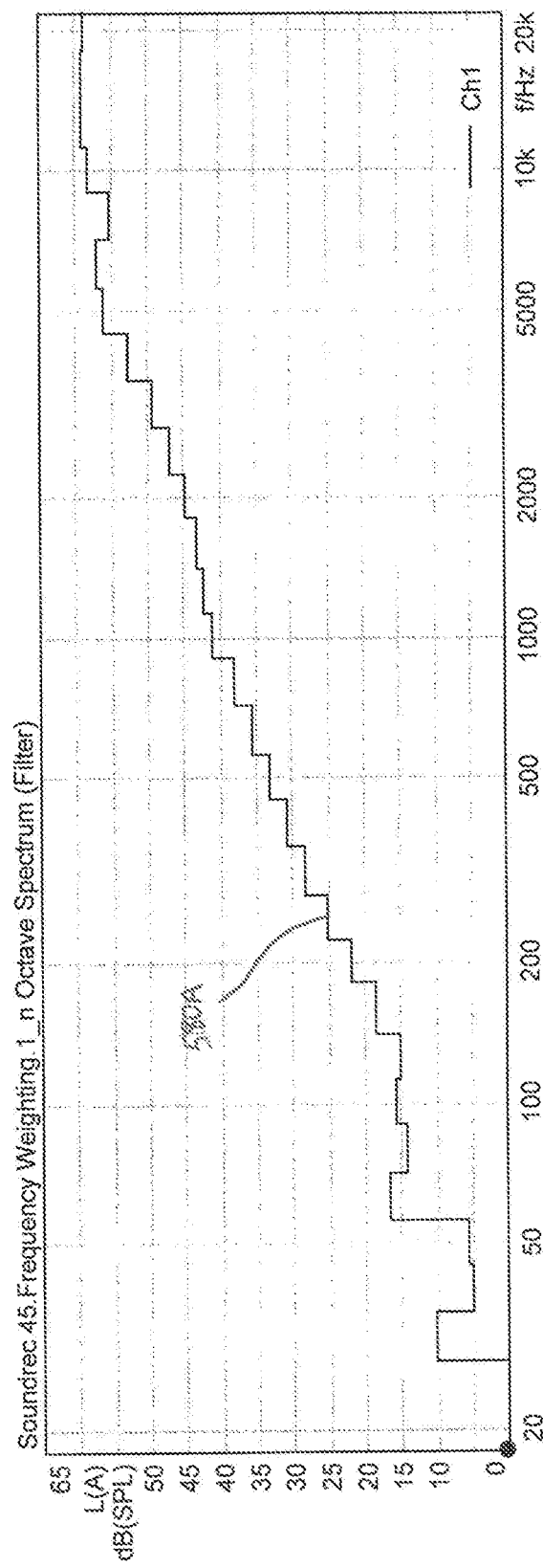
FIG. 17A is a graph illustrating an operating noise profile of the fluidic switching module of FIG. 1.
Figure 17B:
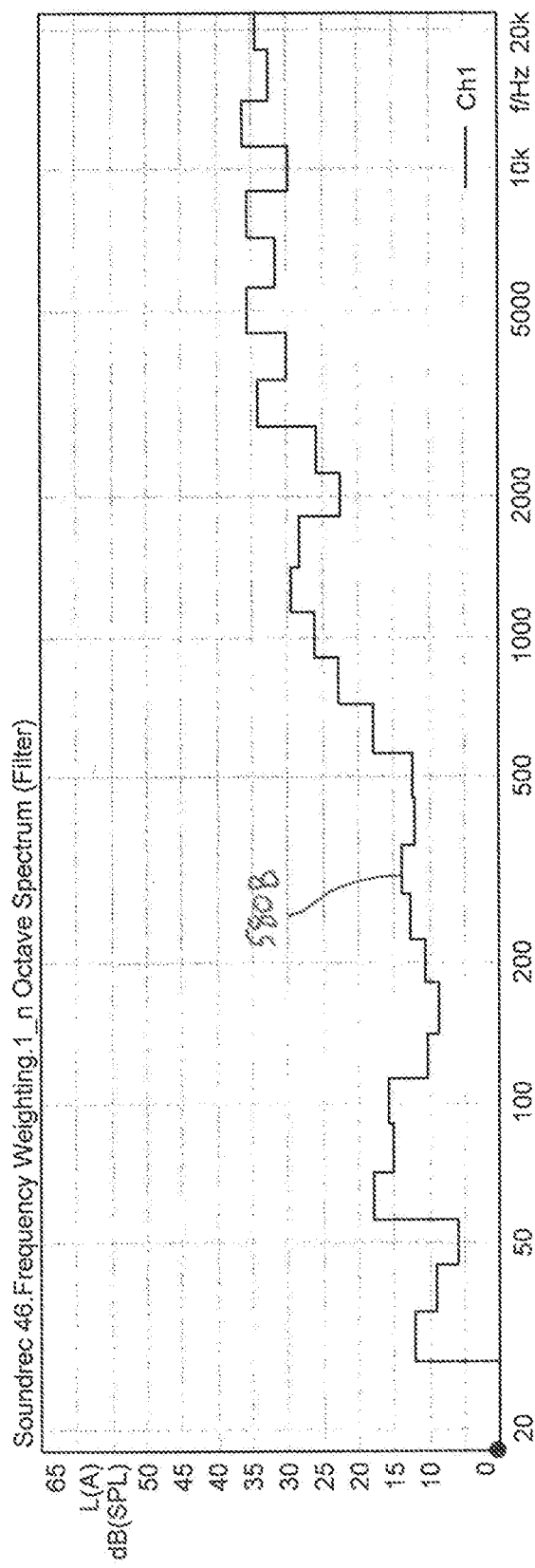
FIG. 17B is a graph illustrating an operating noise profile of the assembly of FIG. 11.

FIGS. 17A and 17B illustrate a comparison of noise profiles or sound output levels 580A, 580B measured experimentally when operating the fluidic switching module 34 without the sound attenuator 504 (FIG. 17A) and when coupled to the sound attenuator 504 (FIG. 17B). In both cases, pressurized air was fed into the pneumatic source connector 46A at a pressure of 60 kPa. Without the sound attenuator 504, the sound output level 580A exceeded 30 decibels (dB) at all frequencies between 500 Hz and 20 kHz and exceeded 35 decibels at all frequencies between 1000 Hz and 20 kHz (FIG. 17A). With the sound attenuator 504, the sound output level 580B remained below 30 dB at all frequencies below 2000 Hz and was substantially less than the sound output level 580A at all frequencies above about 200 Hz. In addition, the sound output level 580B remained below 40 dB across all frequencies between 20 Hz and 20 kHz. The range of 20 Hz to 20 kHz is commonly identified as the audible range for unassisted human hearing (the "audible range."). As such, in the illustrated embodiment, the sound output level 580B of the assembly 500 is less than 40 dB across the entire audible range.

Various features and advantages of the disclosure are set forth in the following claims.

What is claimed is:

1. A pneumatic system comprising:
   a fluidic switching module including
      an air passage, and
      a vent in fluid communication with the air passage; and
   a sound attenuator coupled to the fluidic switching module, the sound attenuator including
      a body having a recess, wherein the fluidic switching module is received within the recess,
      a first chamber within the recess and in fluid communication with the vent wherein the first chamber is partially defined by a first wall of the fluidic switching module and a second wall of the body opposite the first wall, wherein a first surface of the second wall defines a floor of the recess,
      a first orifice in fluid communication with the vent via the first chamber,
      a second chamber in fluid communication with the first chamber via the first orifice, wherein the second chamber is partially defined by a second surface of the second wall opposite the first surface, and
      a second orifice in fluid communication with the first orifice via the second chamber.

2. The pneumatic system of claim 1, wherein a third wall of the fluidic switching module received within the recess is co-planar with a fourth wall of the body of the sound attenuator.

3. The pneumatic system of claim 1, wherein the body is made of polypropylene.

4. The pneumatic system of claim 1, wherein the vent is one of a plurality of vents, and wherein each vent of the plurality of vents is in fluid communication with the first chamber.

5. The pneumatic system of claim 1, wherein the second chamber at least partially surrounds the first chamber.

6. The pneumatic system of claim 1, wherein the first orifice is oriented perpendicular to the vent.

7. The pneumatic system of claim 1, wherein the second orifice is in fluid communication with the ambient environment.

8. The pneumatic system of claim 1, wherein the first chamber has a first resonant frequency, wherein the second chamber has a second resonant frequency, and wherein the first resonant frequency is at least 10% higher than the second resonant frequency.

9. The pneumatic system of claim 8, wherein the first resonant frequency and the second resonant frequency are configured to produce destructive interference to attenuate noise generated by air flowing through the fluidic switching module.

10. A noise attenuator for a fluidic switching module, the noise attenuator comprising:
   a body including a first wall, a first plurality of outer side walls, a plurality of inner side walls extending from the first wall, and a floor extending between the plurality of inner side walls;
   a lid coupled to the body, the lid including a second wall opposite the first wall and a second plurality of outer side walls;
   a first orifice extending through one of the plurality of inner side walls, the first orifice in fluid communication with a chamber extending between the floor and the second wall; and
   a second orifice extending through one outer side wall of the first plurality of outer side walls or one outer side wall of the second plurality of outer side walls.

11. The noise attenuator of claim 10, wherein the plurality of inner side walls and the floor define a recess in the body, and wherein the recess is configured to receive the fluidic switching module.

12. The noise attenuator of claim 11, wherein the chamber at least partially surrounds the recess.

13. The noise attenuator of claim 10, wherein the body and the lid are integrally molded together as a single component.

14. The noise attenuator of claim 10, wherein the second orifice is in fluid communication with the first orifice via the chamber.

15. The noise attenuator of claim 10, wherein the lid is pivotally coupled to the body.

16. A pneumatic system comprising:
   a fluidic switching module including
      an air passage, and
      a vent in fluid communication with the air passage; and
   a sound attenuator coupled to the fluidic switching module, the sound attenuator configured to attenuate noise generated by air flowing through the fluidic switching module to less than 40 dB across the entire audible range, the sound attenuator including
- a first chamber defined by a first wall of the fluidic switching module and including the vent, a first surface of a second wall spaced apart from and opposite the first wall, and a pair of spaced-apart side walls that extend between the first wall and the second wall, wherein the first chamber includes a first opening in one of the pair of spaced-apart sidewalls, and
- a second chamber in fluid communication with the second opening and partially surrounding the first chamber, wherein the second chamber is partially defined by a second surface of the second wall opposite the first surface and the pair of spaced-apart side walls, the second chamber including a second opening to exhaust air from the second chamber.

17. The pneumatic system of claim 16, wherein the first chamber has a first resonant frequency, wherein the second chamber has a second resonant frequency, and wherein the first resonant frequency and the second resonant frequency are configured to produce destructive interference to attenuate the noise.

18. The pneumatic system of claim 16, wherein the first opening extends along a first longitudinal axis and the second opening extends along a second longitudinal axis that is parallel to the first axis.

19. The pneumatic system of claim 16, wherein the first opening and the second opening are oriented such that airflow from the first opening to the second opening changes direction by at least 90 degrees.

20. The pneumatic system of claim 16, wherein the vent, the first opening, and the second opening are oriented such that airflow from the vent to the first opening changes direction in a first direction and airflow from the first opening to the second opening changes direction in a second direction different from the first direction.

21. A pneumatic system comprising:
- a fluidic switching module including
  - an air passage, and
  - a vent in fluid communication with the air passage; and
- a sound attenuator coupled to the fluidic switching module, the sound attenuator including
  - a first chamber in fluid communication with the vent,
  - a first orifice in fluid communication with the vent via the first chamber,
  - a second chamber in fluid communication with the first chamber via the first orifice, and
  - a second orifice in fluid communication with the first orifice via the second chamber,
- wherein the first chamber has a first resonant frequency, the second chamber has a second resonant frequency, and the first resonant frequency is at least 10% higher than the second resonant frequency.

22. The pneumatic system of claim 21, wherein the first resonant frequency and the second resonant frequency are configured to produce destructive interference to attenuate noise generated by air flowing through the fluidic switching module.

* * * * *